United States Patent
Yamamoto et al.

(10) Patent No.: US 12,486,504 B2
(45) Date of Patent: Dec. 2, 2025

(54) DRUG DELIVERY COMPOSITION, METHOD FOR PRODUCING SAME AND USE THEREOF

(71) Applicant: Hirofumi Yamamoto, Osaka (JP)

(72) Inventors: Hirofumi Yamamoto, Osaka (JP); Masaki Mori, Atsugi (JP); Shuji Akai, Nishinomiya (JP); Xin Wu, Shanghai (CN)

(73) Assignee: Hirofumi Yamamoto, Osaka (JP)

( * ) Notice: Subject to any disclaimer, the term of this patent is extended or adjusted under 35 U.S.C. 154(b) by 391 days.

(21) Appl. No.: 18/262,131

(22) PCT Filed: Jan. 18, 2022

(86) PCT No.: PCT/JP2022/001541
§ 371 (c)(1),
(2) Date: Jul. 19, 2023

(87) PCT Pub. No.: WO2022/158440
PCT Pub. Date: Jul. 28, 2022

(65) Prior Publication Data
US 2024/0084299 A1 Mar. 14, 2024

(30) Foreign Application Priority Data
Jan. 19, 2021 (JP) ................................ 2021-006747

(51) Int. Cl.
C12N 15/113 (2010.01)
A61K 9/14 (2006.01)
A61K 31/7105 (2006.01)
A61P 35/00 (2006.01)

(52) U.S. Cl.
CPC ............ *C12N 15/113* (2013.01); *A61K 9/143* (2013.01); *A61K 9/146* (2013.01); *A61K 31/7105* (2013.01); *A61P 35/00* (2018.01); *C12N 2310/14* (2013.01); *C12N 2310/141* (2013.01)

(58) Field of Classification Search
None
See application file for complete search history.

(56) References Cited

U.S. PATENT DOCUMENTS

| | | | |
|---|---|---|---|
| 2009/0324725 A1 | 12/2009 | Masubuchi et al. | |
| 2014/0302145 A1 | 10/2014 | Yamamoto et al. | |
| 2020/0188423 A1* | 6/2020 | Yamamoto | A61K 9/143 |

FOREIGN PATENT DOCUMENTS

| | | |
|---|---|---|
| JP | 4536655 B2 | 9/2010 |
| JP | 5436650 B1 | 3/2014 |
| WO | WO 2004/043495 A1 | 5/2004 |
| WO | WO 2018/199121 A1 | 11/2018 |

OTHER PUBLICATIONS

European Patent Office, Extended European Search Report in European Patent Application No. 22742562.6 (Mar. 14, 2025).
Abd-Aziz et al., "Development of MicroRNA as Potential Therapeutics against Cancer," *J. Oncol.*, 2020: 8029721 (2020).
Chowdhury et al., "pH-Sensing Nano-Crystals of Carbonate Apatite: Effects on Intracellular Delivery and Release of DNA for Efficient Expression into Mammalian Cells," *Gene*, 376(1): 87-94 (2006).
Forterre et al., "A Comprehensive Review of Cancer MicroRNA Therapeutic Delivery Strategies," *Cancers*, 12(7): 1852 (2020).
Inoue et al., "A miR-29b Byproduct Sequence Exhibits Potent Tumor-Suppressive Activities via Inhibition of NF-$_\kappa$B Signaling in KRAS-Mutant Colon Cancer Cells," *Mol. Cancer. Ther.*, 17(5): 977-987 (2018).
Mozar et al., "Surface-Modification of Carbonate Apatite Nanoparticles Enhances Delivery and Cytotoxicity of Gemcitabine and Anastrozole in Breast Cancer Cells," *Pharmaceutics.*, 9(2): 21 (2017).
Mozar et al., "PEGylation of Carbonate Apatite Nanoparticles Prevents Opsonin Binding and Enhances Tumor Accumulation of Gemcitabine," *J. Pharm. Sci.*, 107(9): 2497-2508 (2018).
Wu et al., "Innovative Delivery of siRNA to Solid Tumors by Super Carbonate Apatite," *PLoS ONE*, 10(3): e0116022 (2015).
Japan Patent Office, International Search Report in International Patent Application No. PCT/JP2022/001541 (Mar. 1, 2022).

* cited by examiner

*Primary Examiner* — Danah Al-Awadi
(74) *Attorney, Agent, or Firm* — Leydig, Voit & Mayer, Ltd.

(57) ABSTRACT

The present invention provides a safe and effective DDS technique that realizes higher accumulation in lesions and reduced accumulation in normal organs including the liver, and thus can afford sufficient therapeutic effects with smaller amounts of drugs. Specifically, a composition containing carbonate apatite particles loaded with a drug, wherein the particles have an average particle size of larger than 500 nm and not more than 1000 nm, primary particles are formed in the presence of a polyethylene glycol (PEG) derivative having one or more carboxylic acids or derivatives thereof or salts thereof at the ends thereof, and the PEG derivative is taken up in the primary particles, is provided.

18 Claims, 29 Drawing Sheets

DRUG DELIVERY COMPOSITION, METHOD FOR PRODUCING SAME AND USE THEREOF

TECHNICAL FIELD

The present invention relates to compositions for drug delivery that show high accumulation in target tissues/organs and sufficiently reduced accumulation in normal organs, production methods thereof and use thereof.

BACKGROUND ART

A calcium phosphate co-precipitation method is known as a method for non-viral nucleic acid transfection into cells. Although this method has advantages such as low toxicity, non-immunogenicity, simple operation, and the like, it has the disadvantage of low nucleic acid transfection efficiency and low expression efficiency.

Akaike et al. improved the efficiency of nucleic acid transfection in vitro by using carbonate apatite (having a chemical structure in which a part of the hydroxy groups of hydroxyapatite ($Ca_{10}(PO_4)_6(OH)_2$) is substituted by a carbonate group) as a carrier (Patent Literature 1, Non Patent Literature 1). That is, an agent for introduction into cells that dissolves, when the pH of composite particles composed of nucleic acid and carbonate apatite is changed from pH 8.0 to pH 6.0, at least 50% of the aforementioned composite particles present at pH 8.0, within a predetermined time after the pH is changed to 6.0 is disclosed. Composite particles are taken up into cells by endocytosis and released from endosomes into the cytoplasm. Since the pH in the endosome is acidic (about pH 5.5), the taken-up composite particles are exposed to changes in the external pH from around pH 7 to pH 5, are rapidly dissolved, and release the nucleic acid, thus affording high efficiency in introduction into cells.

However, carbonate apatite particles easily aggregate, and when intravenously injected into mice, they immediately cause vascular embolism, resulting in immediate death of the mice. Therefore, in vivo administration was not possible.

The present inventors have succeeded in finely dispersing conventional carbonate apatite particles to an average particle size of 50 nm or below by ultrasonication using an ultrasonic cleaner generally used for cleaning test tubes and the like, thus enabling vascular administration to animals. These microparticles markedly improve the efficiency of substance uptake into cells, and when microparticles loaded with a drug having antitumor activity are intravenously administered to a tumor model mouse, the drug is efficiently delivered to the tumor tissue, accumulation thereof in the liver and kidney is reduced as compared to liposomes and atelocollagen, and the antitumor activity is successfully improved greatly with a smaller amount of the drug than before (Patent Literature 2, Non Patent Literature 2). The carbonate apatite microparticles were named super carbonate apatite (sCA). The present inventors have demonstrated therapeutic effects on various diseases including cancer by loading sCA particles with small RNA molecules having therapeutic activity such as various siRNAs and miRNAs and other drugs and administering the particles in vivo to animals (e.g., reviews of Non Patent Literatures 3 and 4, Non Patent Literature 5).

However, since intravenous administration of sCA alone to *Macaca fascicularis* caused liver dysfunction (Non Patent Literature 2), it was suggested that sCA still accumulates in normal organs such as the liver and the like even when sCA is used. In addition, systems based on inorganic ions represented by sCA have been viewed as containing a problem of low delivery efficiency of genes to lesions (Non Patent Literature 3).

Thus, it is essential to develop a drug delivery system (DDS) technique that realizes higher accumulation in lesions and reduced accumulation in normal organs including the liver, for safe use in medical applications to humans.

CITATION LIST

Patent Literature

[PTL 1]
JP-B-4536655
[PTL 2]
JP-B-5436650

Non Patent Literature

[NPL 1]
Gene. 2006; 376(1):87-94.
[NPL 2]
PLoSOne. 2015 Mar. 4; 10(3): e0116022. doi: 10.1371/journal.pone.0116022.
[NPL 3]
Cancers 2020, 12, 1852; doi:10.3390/cancers12071852
[NPL 4]
Journal of Oncology Volume 200, Article ID 8029721, 14 pages https://doi.org/10.1155/2020/8029721
[NPL 5]
Mol Cancer Ther. 2018 May; 17(5):977-987. doi: 10.1158/1535-7163.

SUMMARY OF INVENTION

Technical Problem

The present invention aims to realize higher accumulation in lesions and reduced accumulation in normal organs including the liver, thereby providing a safe and effective DDS technology that can afford sufficient therapeutic effects with a smaller amount of drug.

Solution to Problem

The present inventors have found that drug introduction using sCA still results in accumulation in not only target tissues/organs (e.g., cancer lesions), but also normal organs such as the liver, spleen, and lung, with particularly high accumulation in the liver (FIG. 7). As the cause thereof, the present inventors took note of the fact that macroscopically micron-sized particles were still present even after the majority of particles come to have an average particle size of 50 nm or less due to ultrasonication (Non Patent Literature 2). Therefore, intensive studies were conducted as to filtration of sCA particles, nanoparticulation by laser, use of other crushing treatments, polyethylene glycol (PEG) modification of the surface of sCA particles, and the like, but none of these can eliminate the residual giant particles.

Then, the present inventors had an idea of achieving microparticulation by taking up the PEG like a "nail" when forming particles, instead of modifying the surface of the sCA particles with PEG, and combining same with a crushing treatment. Therefore, using a PEG derivative with an average molecular weight of 2,000 and a PEG derivative with an average molecular weight of 10,000, the PEG derivatives were added from the beginning to the buffer during the production of carbonate apatite. As a result, the amount of sCA particles (liquid turbidity) was visually less in the former than in the case without a PEG derivative. Thus, a PEG derivative with a molecular weight of 10,000 was used for the study. As a result, in the conventional water-tank ultrasonic washing and wet crushing treatment, the particles were too large to obtain a clear image in atomic force microscope (AFM) observation. When a special ultrasonication called Covaris was used, dispersion was achieved to the extent that the particles could be clearly identified by AFM, and a single peak was also obtained by dynamic scattering method (DLS), with an average particle size of 650 nm. Even with the addition of intense Covaris ultrasonication, the nucleic acids within the particles were preserved without degradation to the same extent as with the water-tank ultrasonic washing.

MicroRNA (miR-34a) was loaded on sCA wherein PEG derivative had been added thereto during particle formation, and the sCA was ultrasonicated. The sCA was added to miR-34a-sensitive colorectal cancer cells. As a result, Covaris-treated sCA exhibited the same level of cytotoxicity as conventional sCA that underwent water-tank ultrasonic washing.

The average particle size of the Covaris-treated particles as measured by DLS was 650 nm. When diluted 50 times and measured by AFM, the fine particles were around 30 nm. Since the particles measured by DLS accounted for the majority of the particle volume, they were considered to afford an anti-tumor effect of nucleic acid, and verification was performed. Using a hollow fiber membrane, the particles were size fractionated into particles of 10-50 nm, 50-200 nm, and 200-1000 nm, and the amount of nucleic acid (MIRTX: Non Patent Literature 5) loaded in each fraction was measured. As a result, nucleic acid in the amount of ⅛ of conventional sCA was present in the fraction of 200 to 1000 nm, and below the detection limit in smaller fractions. Each fraction and conventional sCA were each intravenously administered to nude mice subcutaneously implanted with MIRTX-sensitive pancreatic cancer cells. As a result, the 200-1000 nm fraction suppressed tumor growth more significantly than conventional sCA, even though the amount of nucleic acid was one-eighth of the amount of the nucleic acid loaded on sCA. On the other hand, fractions with smaller particle sizes did not exhibit tumor growth suppressive effects.

From the above, the present inventors have demonstrated that the 200-1000 nm fractions are the main body of the antitumor effect. In addition, the new DDS prepared in this way was named cNaD1 (Controlled inorganic Nanoparticle Drug 1).

Fluorescently-labeled nucleic acids were loaded on sCA or cNaD1 and administered intravenously to tumor-bearing mice. Then tumors and normal organs were excised from the mice and fluorescence intensity was measured. As a result, the fluorescent nucleic acid loaded on cNaD1 emitted light in tumors in the same manner as when sCA was administered, even though the amount was one-eighth the amount of sCA. On the other hand, accumulation in normal organs including the liver was greatly reduced as compared with sCA.

Since cNaD1 with a significantly lower amount of nucleic acid than sCA showed a therapeutic effect superior to that of sCA, the present inventors used a PEG derivative with an average molecular weight of 2000 and had the PEG derivative taken up during particle formation. As a result, surprisingly, when the PEG derivative with an average molecular weight of 2,000 is used, the resultant particles showed a single peak of an average particle size of 740 nm in DLS, without the need for ultrasonication or fractionation using a hollow fiber membrane, and could be directly used as a carrier for drug delivery. As in the case of cNaD1, it exhibited a significantly superior antitumor effect at a dose remarkably lower than that of sCA. On the other hand, even when administered at a high dose equivalent to sCA, almost no accumulation in normal tissues was observed. Thus, particles prepared using a PEG derivative with an average molecular weight of 2000 were named cNaD2.

In cNaD2, the particle performance was examined over time after lapse of time from the dissolution of the PEG derivative. As a result, it was clarified that the amount of nucleic acid uptake per amount of Ca uptake (NA/Ca ratio) becomes the highest and the nucleic acid loading efficiency is improved when particles are formed two or three days after dissolution of the PEG derivative. The PEG derivative used here is a derivative in which one end is methylated and the other end is added with an ester of carboxylic acid and N-hydroxysuccinimide (NHS), and tends to be hydrolyzed easily. The present inventors considered that the 5-membered ring at the end might not be necessary because the amount of nucleic acid in the particles increased as hydrolysis proceeded. They synthesized PEG derivatives with a free carboxylic acid at the end from monomethylated PEG, produced particles using same, and compared the amount of loaded nucleic acid with that of cNaD2. As a result, particles made with any of the synthesized monomethyl monocarboxylic acid PEGs could be loaded with nucleic acids in amounts equivalent to or greater than those in cNaD2. Fluorescence-labeled nucleic acids were loaded on the particles made using monomethyl monocarboxylic acid PEG, and accumulation in tumors and livers by administration to tumor-bearing mice was examined. As a result, accumulation in the tumors increased remarkably and accumulation in the liver decreased remarkably, as compared with sCA. On the other hand, when ordinary PEG without a terminal carboxylic acid was used, tumor specificity was equivalent to or lower than that of sCA.

From the above, it was suggested that PEG to be used for cNaD is preferably a PEG derivative having one or more carboxylic acids at the end. Thus, the present inventors further prepared 4 kinds of mono- or di-carboxylic acid PEGs, produced particles using these PEGs, loaded them (cNaD3-cNaD6) with fluorescent nucleic acids, and intravenously administered the particles to tumor-bearing mice. As a result, superior accumulation in tumors and reduced accumulation in normal organs such as the liver were confirmed, similar to cNaD1 and cNaD2.

The present inventors have completed the present invention based on these findings.

That is, the present invention provides the following.

[Item 1]

A composition comprising carbonate apatite particles loaded with a drug, wherein the particles have an average particle size of larger than 500 nm and not more than 1000 nm, primary particles are formed in the presence of a polyethylene glycol (PEG) derivative having one or more carboxylic acids or derivatives thereof or salts thereof at the ends thereof, and the PEG derivative is taken up in the primary particles.

[Item 2]

The composition of item 1, wherein the aforementioned PEG derivative has an average molecular weight of 1000 to 20000.

[Item 3]
The composition of item 1 or 2, wherein the aforementioned composition comprises the aforementioned PEG derivative and/or a reaction product thereof.
[Item 4]
The composition of item 3, wherein the aforementioned PEG derivative has an average molecular weight of 1000 to 5000.
[Item 5]
The composition of any one of items 1 to 4, wherein the aforementioned PEG derivative has one or more carboxylic acids or salts thereof at the end thereof.
[Item 6]
The composition of any one of items 1 to 5, wherein the drug is a nucleic acid.
[Item 7]
The composition of any one of items 1 to 6, wherein the drug has an antitumor activity.
[Item 8]
The composition of any one of items 1 to 7, further comprising albumin.
[Item 9]
A method for producing the composition of item 1, comprising ultrasonicating carbonate apatite particles loaded with a drug and a PEG derivative with a one-point focused-ultrasonicator.
[Item 10]
The method of item 9, wherein the carbonate apatite particle loaded with the drug and the PEG derivative is prepared by mixing a first solution comprising the drug and calcium ion, a second solution comprising phosphate ion and bicarbonate ion, and the PEG derivative.
[Item 11]
The method of item 9 or 10, further comprising concentrating the composition of claim 1 using a hollow fiber membrane.
[Item 12]
A composition for drug delivery, comprising the composition of any one of items 1 to 8.
[Item 13]
The composition of item 12, wherein the drug has an antitumor activity and a target tissue is a tumor.
[Item 14]
The composition of item 12, wherein the drug has an anti-inflammatory activity and a target tissue is an inflamed tissue.

Advantageous Effects of Invention

According to the present invention, safe and effective compositions for drug delivery are provided that show higher accumulation in lesions and reduced accumulation in normal organs including the liver and afford sufficient therapeutic effects with smaller amounts of drugs.

BRIEF DESCRIPTION OF DRAWINGS

FIG. 1-2 Diagrams showing changes in particle size due to ultrasonication of carbonate apatite particles formed in the presence of a PEG derivative (SUNBRIGHT ME-100CS).
FIG. 2 Diagrams showing the effects of the amounts added of PEG derivative (SUNBRIGHT ME-100CS) on particle formation.
FIG. 12-1 A diagram showing accumulation of nucleic acid in tumors 1 hr after administration of Alexa750-labeled NC siRNA loaded on sCA or cNaD2 to tumor-bearing mice.
FIG. 12-2 A diagram showing accumulation of nucleic acid in normal organs 4 hr after administration of Alexa750-labeled NC siRNA loaded on sCA or cNaD2 to tumor-bearing mice.
FIG. 15-1 Diagrams showing accumulation of nucleic acid in tumors 1 hr after administration of Alexa750-labeled NC siRNA loaded on carbonate apatite particles (Handai-C1, Hamari-C1) produced in the presence of monomethyl monocarboxylic acid PEG, carbonate apatite particles produced in the presence of HO-PEG-OH, sCA, and sCA particles with PEG-modified surface (Pegylation), with a constant amount of Ca (0.1 mg), to tumor-bearing mice.
FIG. 15-2 Diagrams showing accumulation of nucleic acid in normal organs 4 hr after administration of Alexa750-labeled NC siRNA loaded on carbonate apatite particles (Handai-C1, Hamari-C1) produced in the presence of monomethyl monocarboxylic acid PEG, carbonate apatite particles produced in the presence of HO-PEG-OH, sCA, and sCA particles with PEG-modified surface (Pegylation), with a constant amount of Ca (0.1 mg), to tumor-bearing mice.
FIG. 16-1 Diagrams showing accumulation of nucleic acid in tumors 1 hr after administration of Alexa750-labeled NC siRNA loaded on carbonate apatite particles (Handai-C1, Hamari-C1) produced in the presence of monomethyl monocarboxylic acid PEG, carbonate apatite particles produced in the presence of HO-PEG-OH, sCA, and sCA particles with PEG-modified surface (Pegylation), with a constant amount of nucleic acid (15 μg), to tumor-bearing mice.

FIG. 16-2 Diagrams showing time-course changes in FIG. 16-1. The figure shows accumulation of nucleic acid in tumors 1 hr (left) and 4 hr (right) after administration of Alexa750-labeled NC siRNA loaded on carbonate apatite particles (Handai-C1, Hamari-C1) produced in the presence of monomethyl monocarboxylic acid PEG, carbonate apatite particles produced in the presence of HO-PEG-OH, sCA, and sCA particles with PEG-modified surface (Pegylation), with a constant amount of nucleic acid (15 μg), to tumor-bearing mice.

FIG. 16-3 Diagrams showing accumulation of nucleic acid in normal organs 4 hr after administration of Alexa750-labeled NC siRNA loaded on carbonate apatite particles (Handai-C1, Hamari-C1) produced in the presence of monomethyl monocarboxylic acid PEG, carbonate apatite particles produced in the presence of HO-PEG-OH, sCA, and sCA particles with PEG-modified surface (Pegylation), with a constant amount of nucleic acid (15 μg), to tumor-bearing mice.

FIG. 16-4 Diagrams showing time-course changes in FIG. 16-3. The figure shows accumulation of nucleic acid in normal organs 1 hr (left) and 4 hr (right) after administration of Alexa750-labeled NC siRNA loaded on carbonate apatite particles (Handai-C1, Hamari-C1) produced in the presence of monomethyl monocarboxylic acid PEG, carbonate apatite particles produced in the presence of HO-PEG-OH, sCA, and sCA particles with PEG-modified surface (Pegylation), with a constant amount of nucleic acid (15 μg), to tumor-bearing mice.

FIG. 21-1 A diagram showing accumulation of nucleic acid in inflamed joints of the four limbs 40 min after administration of Alexa750-labeled NC siRNA loaded on sCA or cNaD1 to rheumatism model mouse.

FIG. 21-2 A diagram showing accumulation of nucleic acid in the liver 45 min after administration of Alexa750-labeled NC siRNA loaded on sCA or cNaD1 to rheumatism model mouse.

DESCRIPTION OF EMBODIMENTS

Figure 1:
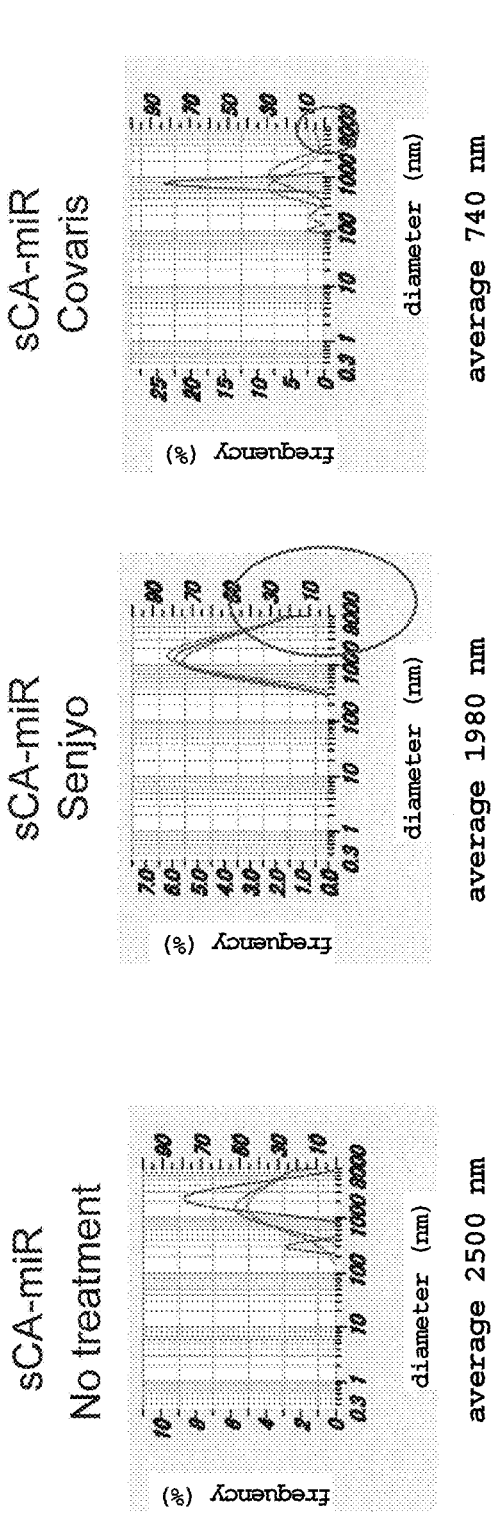
FIG. 1-1 Diagrams showing changes in particle size due to ultrasonication of carbonate apatite particles formed in the absence of a PEG derivative.
Figure 1:
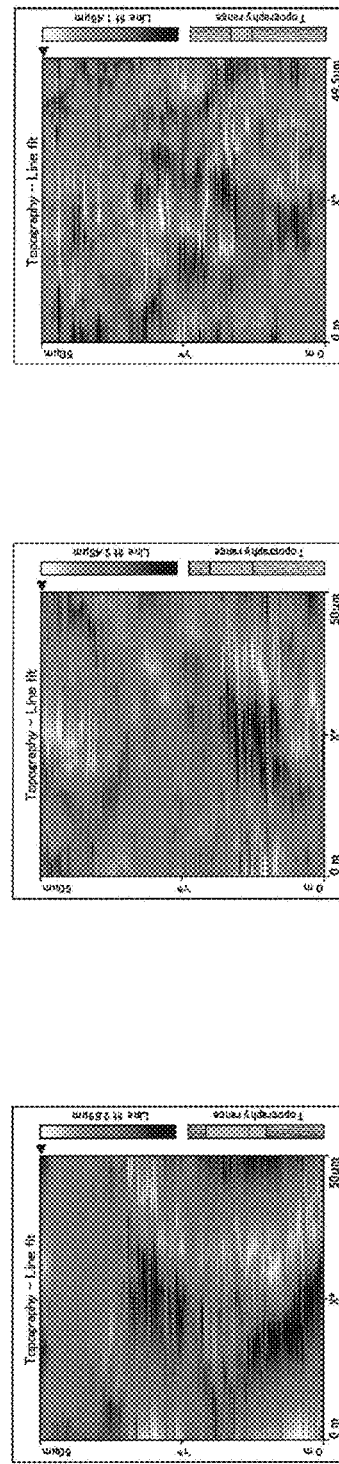

The present invention provides a composition containing carbonate apatite particles loaded with a drug, wherein the particles have an average particle size of larger than 500 nm and not more than 1000 nm, primary particles are formed in the presence of a PEG derivative, and the PEG derivative is taken up in the primary particles (hereinafter also to be referred to as "the composition of the present invention").

The carbonate apatite and carbonate apatite particles that can be used in the present invention are known. Carbonate apatite has a chemical structure in which a part of the hydroxy groups (OH—) of hydroxyapatite ($Ca_{10}(PO_4)_6(OH)_2$) is substituted by a carbonate group ($CO_3^{2-}$), and can be represented by the general formula $Ca_{10-m}X_m(PO_4)_6(CO_3)_{1-n}Y_n$. As used herein, X may be any element that can partially substitute Ca in carbonate apatite and, for example, Sr, Mn, rare earth element, and the like can be mentioned. m is generally a positive number of not less than 0 and not more than 1, preferably not less than 0 and not more than 0.1, more preferably not less than 0 and not more than 0.01, further preferably not less than 0 and not more than 0.001. Y is a unit that can partially substitute $CO_3$ in carbonate apatite and, OH, F, Cl and the like can be recited as examples. n is generally a positive number of not less than 0 and not more than 0.1, preferably not less than 0 and not more than 0.01, more preferably not less than 0 and not more than 0.001, further preferably not less than 0 and not more than 0.0001.

Carbonate apatite particles can be obtained according to a known method. For example, they can be obtained by preparing an aqueous solution containing calcium ion, phosphate ion, and bicarbonate ion. The concentration of each ion in the aqueous solution is not particularly limited as long as carbonate apatite particles are formed, and can be appropriately set with reference to the following.

The concentration of calcium ion in the aqueous solution is generally not less than 0.1 mM, preferably not less than 0.5 mM, more preferably not less than 1 mM. The upper limit of the calcium ion concentration is generally not more than 1 M, preferably not more than 100 mM, more preferably not more than 10 mM.

The concentration of phosphate ion in the aqueous solution is generally not less than 0.1 mM, preferably not less than 0.5 mM, more preferably not less than 1 mM. The upper limit of the phosphate ion concentration is generally not more than 1 M, preferably not more than 100 mM, more preferably not more than 10 mM.

The concentration of bicarbonate ion in the aqueous solution is generally not less than 1.0 mM, preferably not less than 5 mM, more preferably not less than 10 mM. The upper limit of the bicarbonate ion concentration is generally not more than 10 M, preferably not more than 1 M, more preferably not more than 100 mM.

The sources of calcium ion, phosphate ion, and bicarbonate ion are not particularly limited as long as they can supply these ions into the aqueous solution. For example, salts of these ions can be added to the aqueous solution. Specifically, $CaCl_2$ or $CaCl_2 \cdot 2H_2O$ can be used as a calcium ion source, $NaH_2PO_4 \cdot 2H_2O$ can be used as a phosphate ion source, and $NaHCO_3$ can be used as a carbonate ion source.

When the carbonate apatite particles contain another substance, the other substance can be added to the aqueous solution when forming carbonate apatite particles. The "other substance" includes any drug and PEG derivatives described below. The type of drug is not particularly limited. Various physiologically active substances can be used when the carbonate apatite particles are used as carriers of substances to cells or living organisms. In the present specification, the term "loaded" includes a state in which the carbonate apatite particles and other substance are adhered to each other in any manner to form a complex that permits transport of said other substance. Therefore, the "loaded" in the present invention includes a state in which said other substance adheres not only to the inside of the carbonate apatite particles, but also to the outside of the particles. In the present specification, when terms such as "uptake" are used with respect to the relationship between the carbonate apatite particles and said other substance, they mean substantially the same as "loaded".

Examples of the above-mentioned drug include, but are not limited to, nucleic acids such as DNA, RNA, antisense nucleic acid, siRNA, miRNA, aptamer, and the like, polypeptides such as enzyme, peptide or protein, various peptide hormones, and the like, various anticancer agents, therapeutic drug for central nervous system diseases, various antibiotics, therapeutic drug for peripheral neurological disease, therapeutic drug for sensory organ disease, therapeutic drug for circulatory organ disease, therapeutic drug for respiratory organ disease, therapeutic drug for digestive organ disease, hormone preparation, therapeutic drug for urogenital organ disease, therapeutic drug for integument disease, therapeutic drug for dental oral cavity disease, vitamin, analeptic, cell stimulant, antiallergic drug, antiinflammatory drug, and the like.

Only one kind of these drugs may be used singly or two or more kinds thereof can also be used in combination. When the drug is a nucleic acid, it may be DNA, RNA, or a chimeric molecule thereof. Also, the nucleic acid may be single-stranded or double-stranded. While the length of the nucleic acid is not particularly limited, preferred examples include small nucleic acid molecules such as antisense oligonucleotide (ASO), siRNA, miRNA, and aptamer.

In one preferred embodiment, the drug may be a compound having anti-tumor activity. The type of cancer that can be targeted by the compositions of the present invention is not particularly limited, and includes any cancer. For example, it may be cancer derived from epithelial cells, or may also be non-epithelial sarcoma or blood cancer. Specific examples thereof include, but are not limited to, gastrointestinal cancer (e.g., esophageal cancer, gastric cancer, duodenal cancer, colorectal cancer (colorectal cancer, rectal cancer), liver cancer (hepatocellular cancer, cholangiocellular carcinoma), gallbladder cancer, bile duct cancer, pancreatic cancer, anal cancer), urinary organ cancer (e.g., kidney cancer, ureter cancer, bladder cancer, prostate cancer, penile cancer, testis (orchis) cancer), chest cancer (e.g., breast cancer, lung cancer (non-small cell lung cancer, small cell lung cancer)), reproductive organ cancer (e.g., uterine cancer (cervical cancer, uterine cancer), ovarian cancer, vulvar cancer, vaginal cancer), brain tumor, head and neck cancer (e.g., maxillary cancer, pharyngeal cancer, laryngeal cancer, tongue cancer, thyroid cancer), skin cancer (e.g., basal cell carcinoma, squamous cell carcinoma), oral cancer, and blood cancer (leukemia, malignant lymphoma). For embodiments, solid cancer is preferred, colorectal cancer, pancreatic cancer, breast cancer, esophageal cancer, gastric cancer, prostate cancer, and the like are more preferred, and colorectal cancer, pancreatic cancer, and the like are more preferred.

Examples of the compound having antitumor activity to be loaded on the composition of the present invention include, but are not limited to, alkylating agents such as cyclophosphamide hydrate, ifosfamide, thiotepa, busulfaran, melphalan, nimustine hydrochloride, ranimustine, dacalpazine, temozolomide, and the like; antimetabolites such as methotrexate, pemetrexed sodium hydrate, fluorouracil, doxifluridine, capecitabine, tagafur, cytarabine, gemcitabine hydrochloride, fludarabine phosphate ester, nelarabine, cladribine, calcium levofolinate, and the like; antibiotics such as doxorubicin hydrochloride, daunorubicin hydrochloride, prarubicin, epirubicin hydrochloride, idarubicin hydrochloride, aclarubicin hydrochloride, amrubicin hydrochloride, mitoxantrone hydrochloride, mitomycin C, actinomycin D, bleomaciin hydrochloride, puperomacin hydrochloride, zinostatin stimalamer, calicheamicin and the like, microtubule inhibitors such as vincristine sulfate, vinblastine sulfate, vindesine sulfate, paclitaxel and the like; aromatase inhibitors such as anastrozole, exemestane, letrozole, fadrozole hydrochloride hydrate, and the like; platinum preparations such as cisplatin, carboplatin, nedaplatin, oxaliplatin, and the like; topoisomerase inhibitors such as irinotecan hydrochloride hydrate, nogitecan hydrochloride, etoposide, sobuzoxane, and the like, corticosteroids such as predonisolone, dexamethasone, and the like, thalidomide and its derivative lenalidomide, protease inhibitor bortezomib, and the like.

A low-molecular-weight anticancer agent (e.g., molecular weight of 1000 or below) can be linked to a water-soluble polymer directly or via hydrazone or the like to form a high-molecular-weight medicament. While the kind of water-soluble polymer is not particularly limited, examples thereof include polyhydroxypropylmethacrylamide (PHPMA), styrene-maleic acid copolymer, and the like.

Examples of the compound having antitumor activity include antibodies such as anti-EGFR antibody, anti-CD40 antibody, anti-CD33 antibody, anti-HER2 antibody, anti-VEGF antibody, anti-CTLA-4 antibody, anti-PD-1 antibody, anti-PD-L1 antibody, anti-CD20 antibody, and the like, or fragments thereof, sensitive substances that are targets of photodynamic therapy (e.g., polymer-type zinc protoporphyrin (P-ZnPP), albumin-binding-type indocyanine green (ICG)), and the like.

In another preferred embodiment, for example, siRNA, shRNA, dsRNA, microRNA, antisense nucleic acid (antisense DNA, antisense RNA), stabilized artificial nucleic acid BNA, ribozyme, decoy nucleic acid, aptamer, and the like can be mentioned.

More specifically, various miRNAs (e.g., hsa-miR-136-5p, hsa-miR-3065-3p, hsa-miR-4727-5p, hsa-miR-378 g, hsa-miR-181a-5p, hsa-miR-362-5p, hsa-miR-608) (WO2018/181877)) having cancer stem cell proliferation-suppressive effects; miR4689 and miR4685-3p (WO2015/133522) having superior therapeutic effects on colorectal cancer, particularly colorectal cancer with mutations in the KRAS gene; miR-29b, which has been shown to have anti-tumor effects against various cancers such as bile duct cancer, lung cancer, and acute leukemia; KLF5 involved in carcinogenesis, miR-4711-5p suppressing the expression of TFDP1 and MDM2 important for the control of cell cycle (WO2020/246380); siRNA against syndecan 4 (SDC4) highly expressed in cancer stem cells (WO2020036183); CpG oligonucleotide effective as cancer vaccine adjuvant, preferably K-type or D-type CpG oligonucleotide, more preferably K3-type CpG oligonucleotide having both K-type and D-type characteristics (WO2018/030338), and the like can be mentioned. Any nucleic acid known to have antitumor activity can be used without being limited thereto. In addition, the aforementioned nucleic acid may be not only natural nucleic acid but also mutant nucleic acid in which one or more nucleotides in the nucleotide sequence thereof are replaced with other nucleotides, or deletion/insertion or addition is contained, as long as it has an activity equal to or higher than that of natural nucleic acid. For example, as variants of miR-29b, nucleic acids disclosed in WO2015/133521 can be mentioned.

The miRNA may be a mature miRNA, a hairpin precursor miRNA (pri-miRNA), or a pre-miRNA in which a part of the pri-miRNA is cleaved. The siRNA may also be a mature siRNA or a hairpin precursor (shRNA). Alternatively, it may be miRNA in which the loop portion of pre-iRNA or shRNA is replaced with an amino acid (e.g., proline, glycine, lysine, phenylalanine, glutamic acid, glycyl glycine) derivative linker developed by Bonac Corporation.

Nucleic acids to be loaded on the compositions of the present invention may be, where necessary, subjected to various modifications generally applied to nucleic acids in order to impart resistance to degradation by nucleases. Examples of such modification include modification of the sugar chain moiety such as 2'-O methylation; modification of the base moiety; modification of the phosphate moiety such as phosphorothioation, amination, lower alkyl amination, acetylation, and the like.

The composition of the present invention can deliver drugs not only to tumor tissue but also to other disease sites, such as inflamed tissue, with high selectivity. Therefore, the drug to be loaded on the composition may be, for example, a compound having an anti-inflammatory action. An inflamed tissue that the composition of the present invention can target is not particularly limited and may be an inflamed site in any inflammatory disease. Examples of the inflammatory disease include, but are not limited to, various autoimmune diseases (rheumatoid arthritis, SLE, scleroderma, polymyositis, Sjogren's syndrome, ANCA-associated vasculitis, Behcet's disease, Kawasaki disease, mixed cryoglobulinemia, multiple sclerosis, Guillain-Barre syndrome, myasthenia, type 1 diabetes, Basedow's disease, Hashimoto's disease, Addison's disease, IPEX, APS type-II, autoimmune myocarditis, interstitial pneumonia, bronchial asthma, autoimmune hepatitis, primary biliary cirrhosis, inflammatory bowel disease (Crohn's disease, ulcerative colitis), psoriasis, atopic dermatitis, hemolytic anemia, autoimmune thyroiditis, polyarthritis form of idiopathic juvenile arthritis, etc.) and the like.

A compound having an anti-inflammatory action is not particularly limited, and examples thereof include steroidal antiinflammatory drugs (e.g., hydrocortisol, predonisolone, triamcinolone, dexamethasone, betamethasone), non-steroidal antiinflammatory drugs (e.g., aspirin, ethenzamide, diflunisal, loxoprofen, ibuprofen, diclofenac, indomethacin, COX-2 inhibitor), anti-rheumatic drugs (e.g., sodium aurothiomalate, penicillamine, lobenzarit, auranofin, bucillamine, actarit, salazosulfapyridine, mizoribine, methotrexate, leflunomide, tacrolimus, infliximab, etanercept, adalimumab, tocilizumab, abatacept) and the like. Any known anti-inflammatory drugs or therapeutic drugs for the above-mentioned inflammatory diseases can be used.

In one preferred embodiment, miR-29a and miR-29b can be mentioned as miRNAs having therapeutic activity for inflammatory bowel diseases (WO2018/199121).

The aforementioned CpG oligonucleotide can be used not only as a cancer vaccine adjuvant, but also as a vaccine adjuvant against various infectious diseases. Therefore, in another embodiment, the composition of the present invention loaded with CpG oligonucleotides can target cells infected with various pathogens. An infected cell that the composition of the present invention can target is not particularly limited and may be a cell infected with any pathogen. Examples thereof include cells infected with influenza virus, avian influenza virus, parainfluenza virus, adenovirus, SARS virus, AIDS virus, cytomegalovirus, hepatitis virus, Japanese encephalitis virus, measles virus, rubella virus, varicella-zoster virus, poliovirus, papillomavirus, herpes virus, mumps virus, rotavirus, cholera virus, rabies virus, viruses that cause viral hemorrhagic fever such as Ebola hemorrhagic fever, Marburg disease, Lassa fever, Crimean-Congo hemorrhagic fever, and the like, and the like; diphtheria, tetanus, *Bacillus* tuberculosis, pneumococcus, meningococcus, *staphylococcus, Pseudomonas aeruginosa, Bordetella pertussis*, anthrax, *rickettsia, salmonella*, and the like; fungi such as *Cryptococcus aspergillus* and the like; pathogenic organisms such as malaria *plasmodium* and the like, and the like.

When the composition of the present invention is loaded with a CpG oligonucleotide and is used as a vaccine adjuvant, the composition can also carry an antigen protein or peptide derived from the above-mentioned pathogen as a drug and further as an active ingredient.

The concentration of the drug in the aqueous solution used to prepare the carbonate apatite particles can be appropriately determined according to the purpose of use. When a compound having antitumor activity is used as a drug, it can be used at a concentration of, for example, 10 to 1000 µM, 20 to 500 µM, or 40 to 200 µM. When using a nucleic acid such as siRNA, it can be used at, for example, 0.1 to 1000 nM, 0.5 to 500 nM, or 1 to 200 nM.

Regardless of whether the composition of the present invention in a final form contains a PEG derivative, the primary particles of carbonate apatite are formed in the presence of the PEG derivative, as a result of which the PEG derivative is characteristically taken up into the primary particles. As used herein, the term "primary particles" refers to particles obtained by adding a drug and a PEG derivative to an aqueous solution containing calcium ion, phosphate ion, and bicarbonate ion to form carbonate apatite particles loaded with the drug and the PEG derivative. With subsequent treatments (e.g., ultrasonication and size fractionation), the carbonate apatite particles in the final form contained in the composition of the present invention may not contain the PEG derivative or a reaction product thereof (e.g., hydrolyzate).

The aforementioned PEG derivative is not particularly limited as long as it has one or more carboxylic acids or derivatives thereof or salts thereof at the end thereof, and examples thereof include PEG derivatives represented by the following formula:

$$R^1\text{—}X^1\text{—}(CH_2CH_2O)_n\text{—}X^2\text{—}COOR^2$$

wherein $R^1$ and $R^2$ are each independently any substituent and $X^1$ and $X^2$ are each independently any linker.

$R^1$ is, for example, a hydrogen atom, a hydroxy group, a halogen atom, a $C_{1-3}$ alkyl group (e.g., a methyl group), a $C_{1-3}$ alkoxy group (e.g., a methoxy group), an amino group, —COOR$^2$), or the like. $R^1$ is not limited to these as long as PEG derivative and reaction products thereof (e.g., hydrolysate) generate carbonate apatite particles with an average particle size of larger than 500 nm and not more than 1000 nm during particle formation or after ultrasonication as necessary.

$R^2$ is, for example, a hydrogen atom or any substituent that can form an ester with a carboxylic acid (e.g., NHS, p-nitrophenyl). $R^2$ is not limited to these as long as PEG derivative and reaction products thereof (e.g., hydrolysate) generate carbonate apatite particles with an average particle size of larger than 500 nm and not more than 1000 nm during particle formation or after ultrasonication as necessary. When COOR$^2$ is an ester derivative, $R^2$ is preferably a substituent that easily hydrolyzes non-enzymatically to form a free carboxylic acid or a salt thereof (e.g., alkali metal salt, ammonium salt, etc.).

$X^1$ and $X^2$ are, for example, each an oxygen atom, a nitrogen atom, $-Y-CO(CH_2)_m$ (m is an integer of 1 to 3), a $C_{1-5}$ alkyl group, a single bond, or the like.

Y is, for example, a single bond, a $C_{1-3}$ alkyl group (e.g., a methyl group), a $C_{1-3}$ alkoxy group (e.g., a methoxy group), an amino group, an oxygen atom, a sulfur atom, a $C_{1-3}$ alkylamino group (e.g., an ethylamino group), a $C_{1-3}$ alkylthio group (e.g., an ethylthio group), or the like. Y is not limited to these as long as carbonate apatite particles with an average particle size of larger than 500 nm and not more than 1000 nm are generated during particle formation or after ultrasonication as necessary.

Alternatively, the PEG derivative may have a branched chain structure with $R^1$ as a linker and the above-mentioned general formula as a structural unit.

While the molecular weight of the PEG derivative is not particularly limited, it may have an average molecular weight of, for example, 1000 to 20000. Preferably, the PEG derivative may have an average molecular weight of 1000 to 15000. Therefore, in the above-mentioned general formula, n can be any integer that can afford the average molecular weight. In one particularly preferred embodiment, the PEG derivative may have an average molecular weight of about 2000 to about 10000. In the present specification, "about 2000" means not less than 1500 and less than 2500, and "about 10000" means not less than 9500 and less than 10500."

In one preferred embodiment, the PEG derivative may have an average molecular weight of 1000 to 5000. When the PEG derivative has an average molecular weight in this range, carbonate apatite particles with an average particle size of larger than 500 nm and not more than 1000 nm can be obtained even without performing ultrasonication or size fractionation after formation of primary particles. More preferably, in this embodiment, the PEG derivative may have an average molecular weight of 1000 to 3000, further preferably about 2000.

In another preferred embodiment, the PEG derivative is a compound having one or more carboxylic acids or salts thereof at the end thereof. In the case of a PEG derivative of the above-mentioned general formula wherein $COOR^2$ is an ester derivative, the amount of a drug (e.g., nucleic acid) loaded per particle or per amount of Ca becomes maximum by forming carbonate apatite particles 2 or 3 days after dissolution of the PEG derivative. This is because the PEG derivative is gradually hydrolyzed to generate a free carboxylic acid at the end thereof, thereby increasing the nucleic acid load. Therefore, by using a PEG derivative having one or more carboxylic acids or salts thereof at the end thereof, carbonate apatite particles can be advantageously formed immediately after dissolution of the derivative.

In a particularly preferred embodiment, the PEG derivatives used in the present invention include the following six kinds.

1. $MeO(CH_2CH_2O)_n-CO(CH_2)_2COO-NHS$ (average molecular weight 10000)
2. $MeO(CH_2CH_2O)_n-CO(CH_2)_2COO-NHS$ (average molecular weight 2000)
3. $MeO(CH_2CH_2O)_n-CO(CH_2)_2COOH$ (average molecular weight 2000)
4. $MeO(CH_2CH_2O)_n-(CH_2)_2NHCO(CH_2)_2COOH$ (average molecular weight 2000)
5. $MeO(CH_2CH_2O)_n-CH_2COOH$ (average molecular weight 2000)
6. $HOOC(CH_2)_2COO-(CH_2CH_2O)_n-CO(CH_2)_2COOH$ (average molecular weight 2000)

The concentration of the PEG derivative in the aqueous solution used to prepare the carbonate apatite particles may be, for example, 0.25 to 4 mg/ml, preferably 0.5 to 3 mg/ml, more preferably 1 to 2 mg/ml.

The mixing order of each ion source, drug and PEG derivative is not particularly limited, and the aqueous solution may be prepared in any mixing order as long as the desired carbonate apatite particles are obtained. For example, while preparing a first solution containing calcium ion and a drug, a second solution containing phosphate ion and bicarbonate ion and a third solution containing a PEG derivative are separately prepared, and an aqueous solution can be prepared by mixing the first to third solutions simultaneously or sequentially, though not limited thereto.

The aqueous solution for producing the carbonate apatite particles may contain components other than the aforementioned ion sources and other substances as long as the carbonate apatite particles are formed. For example, Ca or $CO_3$ in the carbonate apatite may be partially replaced by adding fluorine ion, chlorine ion, Sr, Mn, and the like to the above-mentioned composition in the aqueous solution. However, the amounts of fluorine ion, chloride ion, Sr, and Mn to be added are preferably within a range that does not remarkably affect the pH solubility and particle size range of the composite particles to be formed. In addition, an aqueous solution for producing carbonate apatite particles can also be prepared using various media and buffers for cell culture.

Carbonate apatite particles can be obtained by adjusting the pH of an aqueous solution containing each of the above-mentioned ions to within the range of 6.0 to 9.0 and allowing it to stand (incubate) for a certain period of time. The pH of the aqueous solution when forming the carbonate apatite particles is preferably not less than 7.0, more preferably not less than 7.1, further preferably not less than 7.2, further more preferably not less than 7.3, particularly preferably not less than 7.4, most preferably not less than 7.5. On the other hand, the pH of the aqueous solution when forming the carbonate apatite particles is preferably not more than 8.5, more preferably not more than 8.0.

The temperature condition of the aqueous solution when forming the carbonate apatite particles is not particularly limited as long as the carbonate apatite particles are formed. It is generally not lower than 10° C., preferably not lower than 25° C., more preferably not lower than 37° C. On the other hand, the upper limit of the temperature condition is generally not higher than 80° C., preferably not higher than 70° C.

Incubation time of the aqueous solution for forming carbonate apatite particles is not particularly limited as long as the carbonate apatite particles are formed. It is generally 1 min to 24 hr, preferably 2 min to 2 hr, more preferably 3 to 60 min. The presence or absence of particle formation can be confirmed, for example, by observing under a microscope.

The average particle size of the carbonate apatite particles contained in the composition of the present invention is not particularly limited as long as it is greater than 500 nm and not more than 1000 nm. It may be preferably 600 nm to 800 nm. The average particle size can be measured by a dynamic scattering method (DLS) using a device known per se (e.g., nanoparticle analyzer nanoPartica SZ-100V2 (manufactured by Horiba, Ltd.), etc.). It is preferable that the particle size distribution by DLS shows a single peak. By controlling the average particle size to be within the above-mentioned range, the drug load per particle increases compared to conventional sCA, and the remarkable effects of the present invention, that is, higher accumulation in target tissues such as tumors and inflamed tissues, reduced accumulation in normal organs including the liver, and sufficient therapeutic effects with lower amounts of drugs, are obtained as compared with sCA.

When a PEG derivative having an average molecular weight of 1000 to 5000, preferably 1000 to 3000, more preferably about 2000, is used as the PEG derivative, by performing the above-mentioned incubation, carbonate apatite particles with an average particle size of larger than 500 nm and not more than 1000 nm, preferably 600 nm to 800 nm, can be obtained even without performing ultrasonication or size fractionation after formation of primary particles.

Therefore, the composition of the present invention containing the carbonate apatite particles contains the PEG derivative or its reaction product (e.g., hydrolysate) used during particle formation.

In the aforementioned embodiment, the amount of the PEG derivative or its reaction product to be contained in the composition of the present invention is not particularly limited as long as carbonate apatite particles with an average particle size of larger than 500 nm and not more than 1000 nm can be formed. It may be generally 0.5 to 2.5 wt %, preferably 1 to 2 wt %, more preferably 1.2 to 1.8 wt %.

On the other hand, when a PEG derivative with an average molecular weight of larger than 5000 (e.g., average molecular weight of not less than 6000, not less than 7000, not less than 8000, not less than 9000, not less than 10000) is used, the carbonate apatite particles formed by performing the above-mentioned incubation still have a large average particle size (e.g., when SUNBRIGHT (registered trademark) ME-100CS manufactured by NOF CORPORATION, which is a PEG derivative with an average molecular weight of 10000, is used, the average particle size measured by DLS is 2200 nm), and the above-mentioned requirements for the carbonate apatite particles of the present invention are not satisfied even if a water-tank ultrasonic washing used to produce conventional sCA particles is performed.

Therefore, in such an embodiment, a composition containing a subset of carbonate apatite particles with an average particle size of larger than 500 nm and not more than 1000 nm, preferably 600 nm to 800 nm, can be obtained by performing ultrasonication using a one-point focused ultrasonicator called Covaris.

Covaris is a special ultrasonication device characterized in that it can efficiently use high output and stable energy for sample treatment by using a frequency completely different from that of general sonicators, and concentrating and irradiating the ultrasonic energy generated from a dish-shaped ultrasonic generator on one pole. As the device, for example, Covaris S220 of M&S Instruments Inc. can be used. As the ultrasonic irradiation conditions, for example, Peak Incident Power (PIP): 250 W, Duty Factor (DF): 50%, Cycles per Burst (CPB): 200, treatment time: 1200 sec and the like can be mentioned. Those of ordinary skill in the art can appropriately change the irradiation conditions according to the manual provided by the manufacturer.

Ultrasonication can be performed in the presence of albumin (that is, albumin is added to dispersion containing carbonate apatite particles). This is because carbonate apatite particles having a finer particle size can be obtained and reaggregation of the particles can also be suppressed by performing an ultrasonic vibration treatment in an environment where albumin and carbonate apatite particles coexist.

The amount of albumin to be added to the dispersion containing carbonate apatite particles is not particularly limited as long as the effect of miniaturization and/or suppression of reaggregation is obtained. For example, 0.01 to 50 mg/ml, preferably 0.05 to 10 mg/ml, more preferably about 0.1 to 5 mg/ml, can be added.

Confirmation that a subset of carbonate apatite particles with an average particle size of larger than 500 nm and not more than 1000 nm was obtained by the above-mentioned ultrasonication can be performed by measuring the particle size distribution by DLS and calculating the average particle size, preferably by confirming that the particle size distribution exhibits a single peak. It can also be performed by observing and photographing the dispersion after ultrasonication using an atomic force microscope (AFM) and confirming whether a clear image of particles was obtained.

When the dispersion after ultrasonication is diluted and analyzed using AFM, fine particles of about 30 nm can be confirmed when an appropriate concentration of PEG derivative is added. When the composition of the present invention is used for drug delivery, contamination with such fine particles may reduce the amount of nucleic acid loaded and adversely affect drug delivery with high selectivity to target tissues. Thus, it is preferable to concentrate and purify the desired subset of carbonate apatite particles with an average particle size of larger than 500 nm and not more than 1000 nm (the peak region of particle size distribution measured by DLS). As a method for size fractionation, for example, a method known per se such as ultrafiltration and gel filtration chromatography can be used. Preferably, it can be performed by combining a plurality of hollow fiber membranes. For example, when SUNBRIGHT (registered trademark) ME-100CS manufactured by NOF CORPORATION was used, which is a PEG derivative with an average molecular weight of 10000, a peak region appeared between 200 and 1000 nm in the particle size distribution after ultrasonication as measured by DLS. A fraction with a particle size of 200 to 1000 nm can be concentrated and purified by using hollow fiber membranes with pore sizes of 1000 nm and 200 nm to exclude particles larger than 1000 nm with the former and then exclude particles below 200 nm by passing through the latter.

The composition of the present invention obtained as described above has a remarkably increased drug-loading capacity per particle as compared with conventional sCAs, which is one of the reasons for the higher drug delivery to target tissues such as tumors and inflamed tissues. For example, when the drug is a nucleic acid such as miRNA, the drug-loading capacity of the composition of the present invention may be generally 150 to 500, preferably about 200 to 400, as nucleic acid loading (µg) per particle ($OD_{600}$=1) or per amount of Ca (1 mg).

The composition of the present invention can be prepared as a pharmaceutical composition suitable for parenteral administration (e.g., intravenous administration, intraarterial administration, subcutaneous injection, muscle injection, topical injection, intraperitoneal administration, and the like) as it is, or by precipitating the carbonate apatite particles by centrifugation and redispersing same in a solvent suitable for administration to the living body. A preparation suitable for parenteral administration includes aqueous and non-aqueous isotonic sterile injection liquids that may contain antioxidants, buffers, bacteriostatic agents, tonicity agents, and the like. In addition, aqueous and non-aqueous sterile suspensions can be mentioned, and they may contain suspending agents, solubilizers, thickeners, stabilizers, antiseptics, and the like. The preparation can be enclosed in a container such as an ampoule or vial in a unit dose or multiple doses. In addition, it can also be lyophilized by a method known per se and stored in a state requiring dissolving or suspending in an appropriate sterile vehicle just before use.

Compared to conventional sCA, the composition of the present invention shows higher accumulation in target tissues such as tumors and reduced accumulation in normal organs such as the liver, and provides a sufficient therapeutic effect with a smaller amount of a drug. Therefore, it can be used as a composition for in vivo drug delivery to mammals including humans, and the like. The content of carbonate apatite particles in the composition is, for example, 0.1 to 100% by weight of the total composition.

The dose of the composition of the present invention varies depending on the purpose of administration, administration method, type and severity of disease, and condition of the administration subject (sex, age, body weight, etc.). When a nucleic acid such as miRNA is loaded and administered systemically, the dose is, for example, not less than 0.02 mg/kg and not more than 5 mg/kg, desirably not less than 0.1 mg/kg and not more than 5 mg/kg.

In addition, the composition of the present invention can be used to introduce drugs into cells in vitro. In this case, it can be performed by adding the composition of the present invention to a culture medium of the cells of interest and culturing the cells. The target cell is not particularly limited and, for example, any of bacteria, actinomycetes, yeast, fungi, plant cells, insect cells, animal cells, and the like can be used as the cell.

The present invention is explained in detail in the following by referring to Examples, which are not to be construed as limitative.

EXAMPLE

Example 1 Creation of cNaD1 (Controlled Inorganic Nanoparticle Drug 1) and PCANP (PEG-Dependent Size-Controlled Carbonate Apatite Nanoparticle)

(1) Preparation of Carbonate Apatite Particles Having Taking Up PEG Derivative

To 100 mL of distilled water were added 0.37 g of $NaHCO_3$, 1 M $NaH_2PO_4 \cdot 2H_2O$ (90 µL), and 1 M $CaCl_2$ (180 µL) and they were dissolved therein. In addition, one of two kinds of PEG derivatives with different molecular weights and represented by the formula: $CH_3O-(CH_2CH_2O)_n-CO(CH_2)_2COO-NHS$ (SUNBRIGHT ME-20CS (NOF CORPORATION); average molecular weight 2,000 and SUNBRIGHT ME-100CS (NOF CORPORATION); average molecular weight 10,000) was added, and the pH of the mixture was adjusted to 7.5. 25 mL of the buffer solution was dispensed into a 50 mL Falcon tube (hereinafter also to be referred to as "25 mL buffer"), 50 µg of nucleic acid, and 1 M $CaCl_2$ (100 µL) were added, and the mixture was incubated at 37° C. For comparison, carbonate apatite particles containing no PEG derivative were similarly prepared.

After incubation for 30 min, the amount of particles (turbidity) in the liquid was macroscopically observed. When the PEG derivative with an average molecular weight of 10,000 was added, particles were formed, although the amount of the particles was slightly smaller than when the PEG derivative was not added. On the other hand, when a PEG derivative with an average molecular weight of 2,000 was added, the amount of particles was clearly reduced. Therefore, in subsequent experiments, a PEG derivative with an average molecular weight of 10,000 was used, and carbonate apatite particles were prepared with an incubation time of 60 min.

(2) Examination of Particle Dispersion Treatment

Water-tank ultrasonic washing treatment used in conventional sCA particle production, a special ultrasonication using a one-point focused ultrasonicator that can efficiently irradiate high-power ultrasonic energy, and wet crushing treatment using wet atomization device were performed, and the degree of particle dispersion was compared.

(2-1) Ultrasonication

Water-tank ultrasonic washing treatment (hereinafter sometimes to be abbreviated as "Senjyo") was performed using an ultrasonic washer US-101 from SND Co., Ltd. The Falcon tube obtained in the above-mentioned (1) was placed in a water tank and ultrasonication was performed for 10 min at an oscillation frequency of 38 kHz and an output of 80 W.

In the special ultrasonication (hereinafter sometimes to be abbreviated as "Covaris"""), ultrasonic irradiation was performed under the following irradiation conditions using Covaris S220 from M&S Instruments Inc.

PIP: 250 W
DF: 50%
CPB: 200
treatment time: 1200 sec

Negative control miRNA-loaded carbonate apatite particles were left untreated or subjected to Senjyo ultrasonication or Covaris ultrasonication, and changes in the particle size was examined. The particle size was measured by the dynamic scattering method (DLS) using a nanoparticle analyzer (nanoPartica SZ-100V2) manufactured by Horiba, Ltd. In addition, the untreated or ultrasonicated particles were directly photographed without dilution with an atomic force microscope (AFM) (compact atomic force microscope NaioAFM manufactured by Nanosurf). The results are shown in FIGS. 1-1 and 1-2.

When the PEG derivative was not added, the conventional ultrasonication of sCA particles (Senjyo) showed a large average particle size of 1980 nm, and many particles were outside the measurement range. On the other hand, in the case of Covaris treatment, although there were multiple particle size peaks, the average particle size was 740 nm, which was smaller than the others, and the number of particles outside the measurement range was relatively small (FIG. 1-1, upper). However, in either case, the particles were too large to be photographed with AFM, and a clear image could not be obtained (FIG. 1-1, lower).

Figures 1, 2:
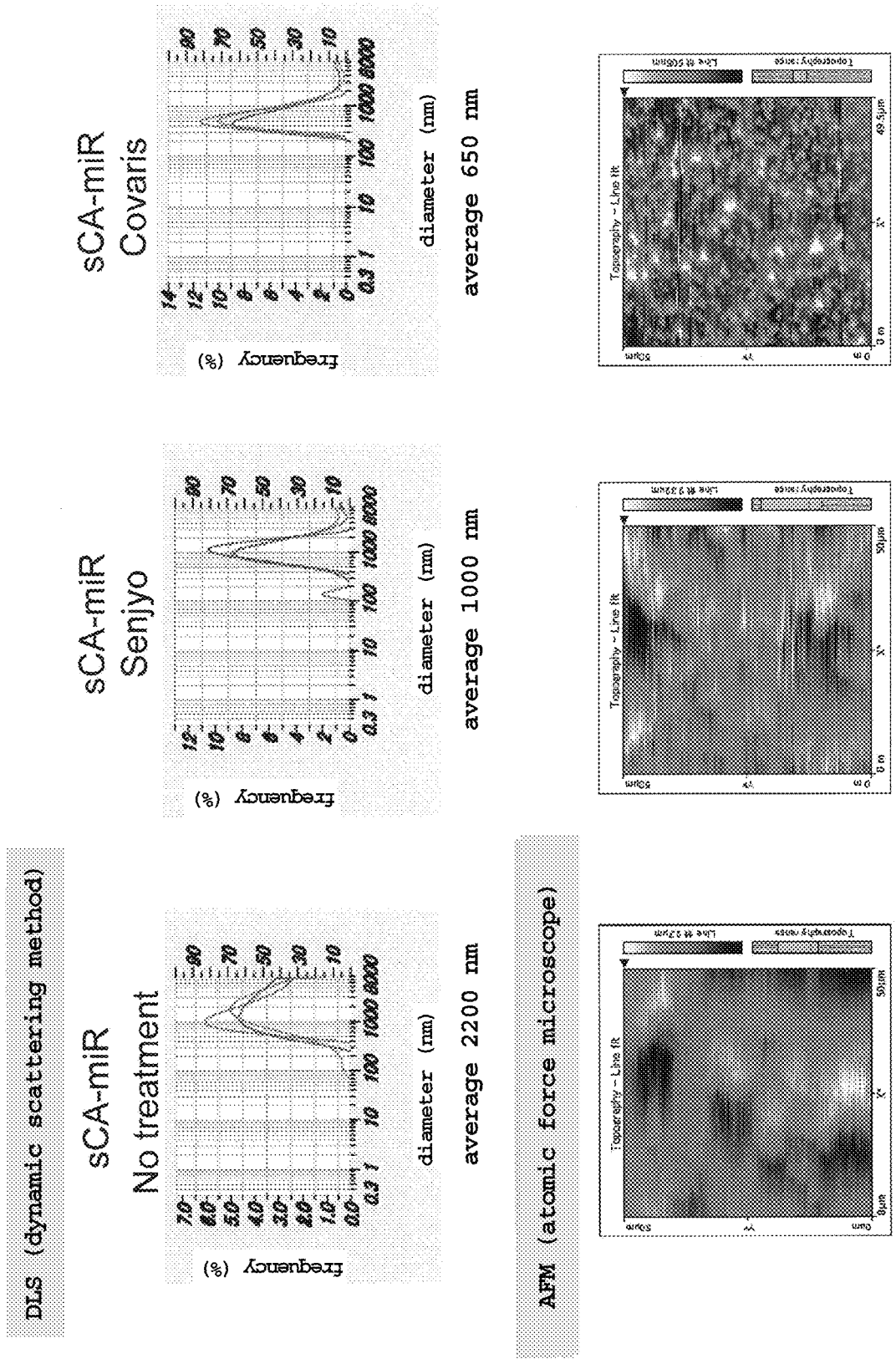
Figure 2:
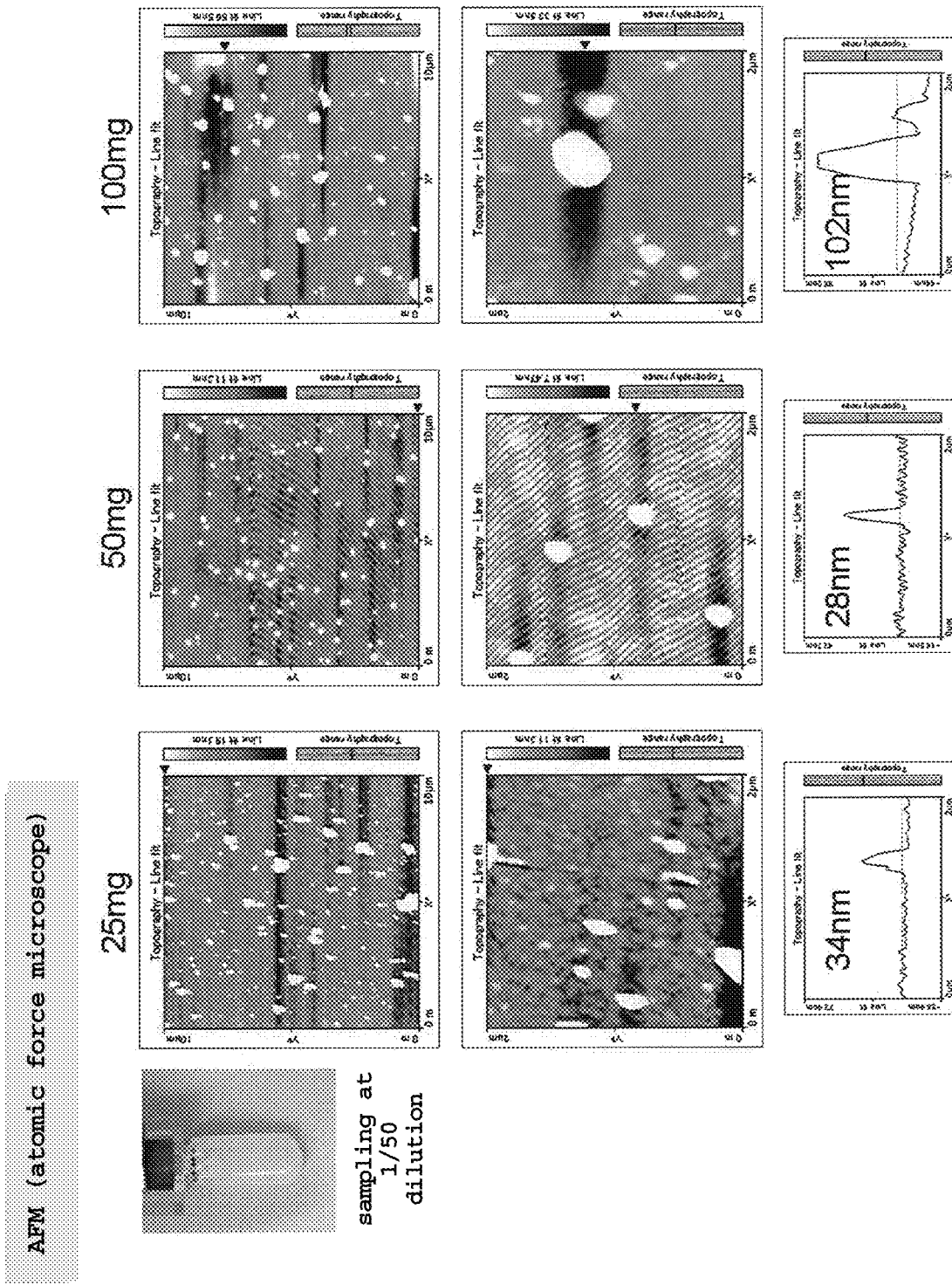

On the other hand, when the PEG derivative was first added to the buffer, the particle size of each group became slightly smaller (FIG. 1-2, upper). Particularly, when the Covaris treatment was performed, dispersion was achieved to the extent that the particles could be clearly identified by AFM (FIG. 1-2, lower). The average particle size was 650 nm, with one peak (FIG. 1-2, upper). Particles obtained by forming carbonate apatite particles in the presence of a PEG derivative (average molecular weight of 10,000) and then performing Covaris treatment are sometimes referred to as cNaD1 (controlled inorganic nanoparticle drug 1).

Particles were formed by varying the amount of PEG derivative (25, 50, 100 mg) to be added to 25 mL buffer, subjected to Covaris treatment, diluted 50-fold, and observed with AFM. As a result, when 25 and 50 mg of PEG derivatives were added, the particle sizes measured were 34 and 28 nm, respectively (FIG. 2). Therefore, in subsequent experiments, the PEG derivative was added at a concentration of 50 mg/25 mL unless otherwise specified.

(2-2) Wet Crushing Treatment

The wet crushing treatment was performed under the conditions shown in Table 1 and using a wet atomization device (Starburst minimo) manufactured by Sugino Machine. The particle size was measured by DLS (using a zeta potential analyzer, Zetasizer Nano Nano-ZS, MALVERN).

TABLE 1

1. Samples and test conditions

| test No. | raw material | additive | injection pressure MPa | number of pass | treated amount mL | chamber |
|---|---|---|---|---|---|---|
| 1 | sample 5 | none | 245 | 10 | 10 | ball |
| 2 | sample 6 | none | 100 | 10 | 10 | ball |
| 3 | sample 1 | yes | 245 | 10 | 10 | ball |
| 4 | sample 2 | yes | 100 | 10 | 10 | ball |
| 5 | sample 3 | yes | 245 | 30 | 10 | ball |
| 6 | sample 7 | none | 245 | 30 | 10 | ball |
| 7 | sample 4 | yes | 100 | 30 | 10 | single |
| 8 | sample 8 | none | 245 | 30 | 10 | single |

The results are shown in Table 2. As a result of DLS analysis, particles of not less than 1000 nm still remained even after the wet crushing treatment. Furthermore, the particles after the treatment turned black, suggesting the possibility of denaturation by the heat reaching 70 to 80° C. due to collision of the particles.

TABLE 2

2. Measurement results

| Measurement device: | zeta potential analyzer Zetasizer Nano Nano-ZS manufactured by MALVERN Measurement cell: Disposable cell Measurement solvent: DW (PH 9.4 adjusted product) Solute refractive index: 1.58 Solvent refractive index: 1.33 | | | |
|---|---|---|---|---|
| | Z-Average (d · nm) | | | |
| test No. | untreated | 5 pass | 10 pass | 30 pass |
| 1 | 5262.944 | — | 4010.835 | — |
| 2 | — | — | 5027.333 | — |
| 3 | 1705.547 | 1232.351 | 1521.319 | — |
| 4 | — | — | 1917.327 | — |
| 5 | — | — | — | 1777.326 |
| 6 | — | — | — | 1577.229 |
| 7 | — | — | 2184.48 | 4824.591 |
| 8 | — | — | — | 1773.175 |

(2-3) Evaluation of Nucleic Acid Amount

Figure 3:
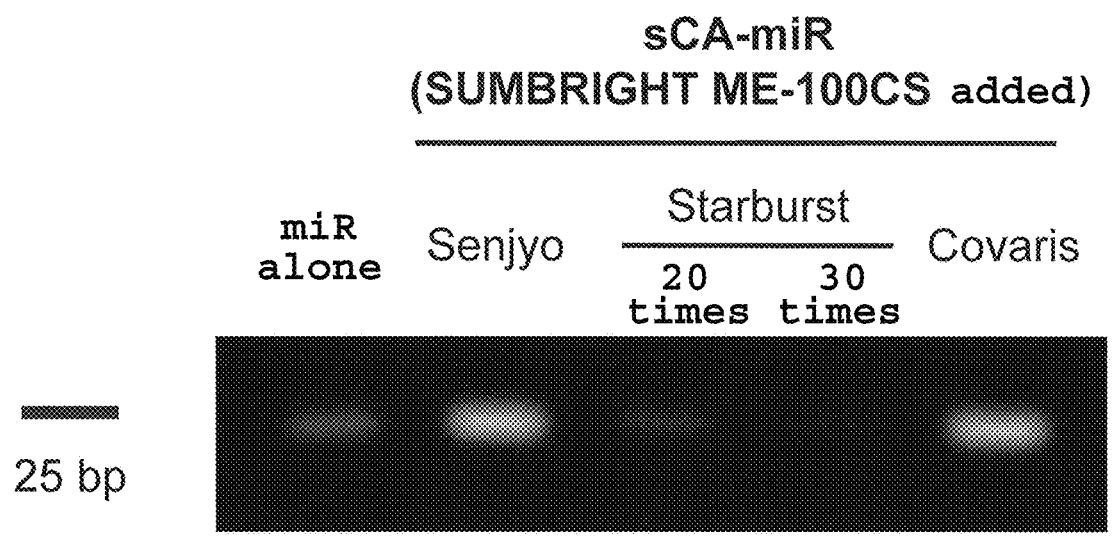
FIG. 3 A diagram showing the results of agarose gel electrophoresis verification of nucleic acids in particles after ultrasonication and wet crushing treatment.

Next, the amount of negative control miRNA loaded on carbonate apatite particles was examined by agarose gel electrophoresis. The results are shown in FIG. 3. A band was observed at around 25 bp for miRNA alone. The amount of miRNA in the carbonate apatite particles prepared by adding PEG derivative was equivalent between Senjyo ultrasonication and Covaris treatment. On the other hand, when wet crushing treatment (Starburst) was performed by collision of ceramic balls 20 to 30 times, a drastic loss of nucleic acid occurred.

Since the in vivo effect of preserved nucleic acids after Senjyo sonication has been verified (Mol Cancer Ther. 2018 May; 17(5):977-987. doi: 10.1158/1535-7163; Mol Ther Nucleic Acids. 2018 Sep. 7; 12:658-671. doi: 10.1016/j.omtn.2018.07.007; PLoS One. 2015 May 13; 10(5): e0127119. doi: 10.1371/journal.pone.0127119; Mol Cancer Ther. 2014 April; 13(4):976-85. doi: 10.1158/1535-7163; Br J Cancer. 2020 March; 122(7):1037-1049. doi: 10.1038/s41416-020-0758-1; Mol Ther Nucleic Acids. 2015 Mar. 10; 4(3): e231. doi: 10.1038/mtna.2015.5; PLoS One. 2015 Mar. 4; 10(3): e0116022. doi: 10.1371/journal.pone.0116022; Front Immunol. 2018 Apr. 18; 9:783. doi: 10.3389/fimmu.2018.00783; Mol Cancer Ther. 2015. PMID: 25904505), a similar effect was expected with particles subjected to Covaris treatment.

(2-4) Cytotoxicity Evaluation

Figure 4:
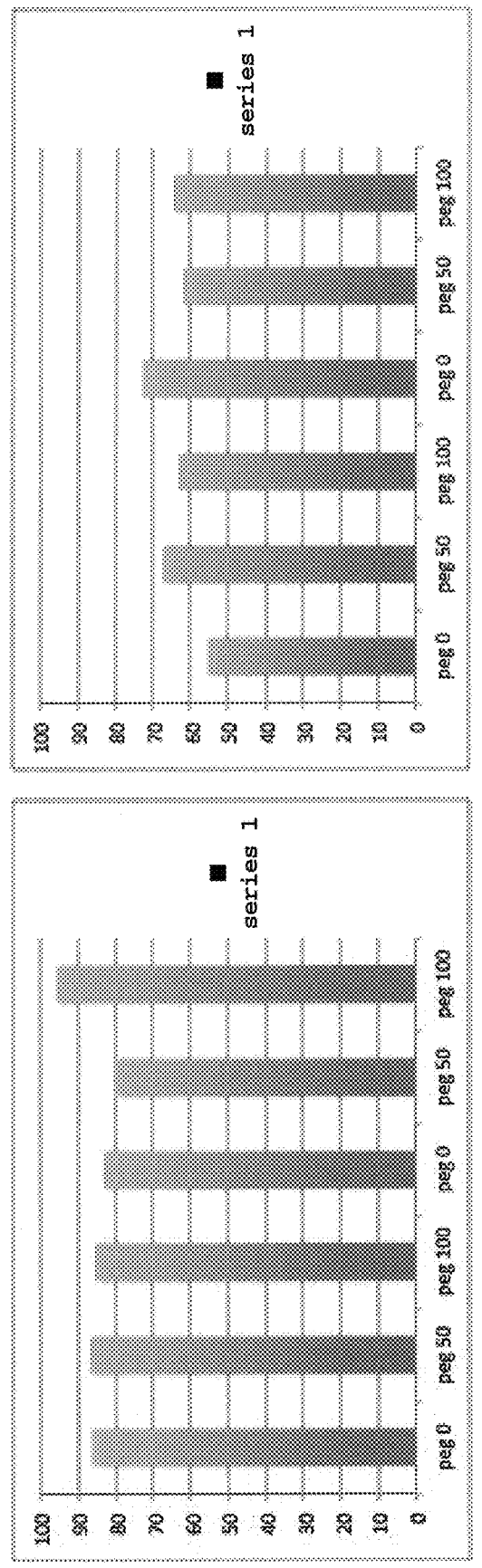
FIG. 4 Diagrams showing that the cytotoxicity of miR-34a is equivalent regardless of the presence or absence of the addition of PEG derivative, even if the method of ultrasonication is changed.

Carbonate apatite particles (sCA-miR34a) loaded with miR-34a were subjected to Senjyo ultrasonication or Covaris ultrasonication. The obtained particles were added to the medium of colorectal cancer cells HCT116 and incubated. After 48 hours and 72 hours, cell viability was measured using Cell counting kit-8 (Dojindo) and in vitro cytotoxicity of each particle was evaluated. In this experiment, a sample (peg0) without addition of PEG derivative (SUNBRIGHT ME-100CS) to 25 mL buffer, a sample with addition of 50 mg (peg50), and a sample with addition of 100 mg (peg100) were prepared and tested. Senjyo-treated peg0 corresponds to conventional sCA particles. The cell viability at each time was calculated with the HCT116 cells free of sCA-miR34a treatment as 100%. As a result, Covaris-treated particles showed cytotoxicity similar to that of Senjyo-treated particles (cell viability was about 80% at 48 hours and about 60% at 72 hours) regardless of the presence or absence, or amount of PEG derivative (FIG. 4).

(3) Identification of the Body of DDS (3-1) Separation by Particle Size

As shown in the above-mentioned (2-1), carbonate apatite particles (cNaD1) obtained by adding PEG derivative (average molecular weight 10,000) to 25 mL buffer and subjecting to Covaris ultrasonication had an average particle size of 650 nm as measured by DLS. When diluted 50-fold with distilled water and measured by AFM, the size of the microparticles was 28 to 34 nm. It was assumed that the volume measured by DLS accounted for the majority of the particle volume and provided the antitumor effect of nucleic acid. Thus, particle size fractionation was performed to demonstrate same.

For size fractionation, the following four kinds of modified polyethersulfone (mPES) hollow fiber membranes (manufactured by Spectrum LABS. COM) were used.

1) pore size: 1 µm, surface area: 95 cm$^2$
2) pore size: 0.2 micrometer, surface area: 28 cm$^2$
3) fraction molecular weight: 750 kD, surface area: 20 cm$^2$
4) fraction molecular weight: 100 kD, surface area: 20 cm$^2$ Using the hollow fiber membrane of 1), particles larger than 1,000 nm were removed and then particles smaller than 200 nm were removed using the hollow fiber membrane of 2) to obtain particle fractions of 200 to 1,000 nm corresponding to the peak area of cNaD1 as measured by DLS. Furthermore, particles smaller than 200 nm were passed through the hollow fiber membrane of 3) to remove particles smaller than 50 nm, whereby a particle fraction of 50 to 200 nm was obtained. Particles smaller than 50 nm were passed through the hollow fiber membrane of 4) to remove particles smaller than 10 nm, whereby a particle fraction of 10 to 50 nm was obtained. Particles in which cNaD1 is divided into different size fractions in this way by hollow fiber membranes are sometimes referred to as PEG-dependent size-controlled carbonate apatite nanoparticles (PCANPs).

(3-2) Evaluation of Nucleic Acid Amount

Figure 5:
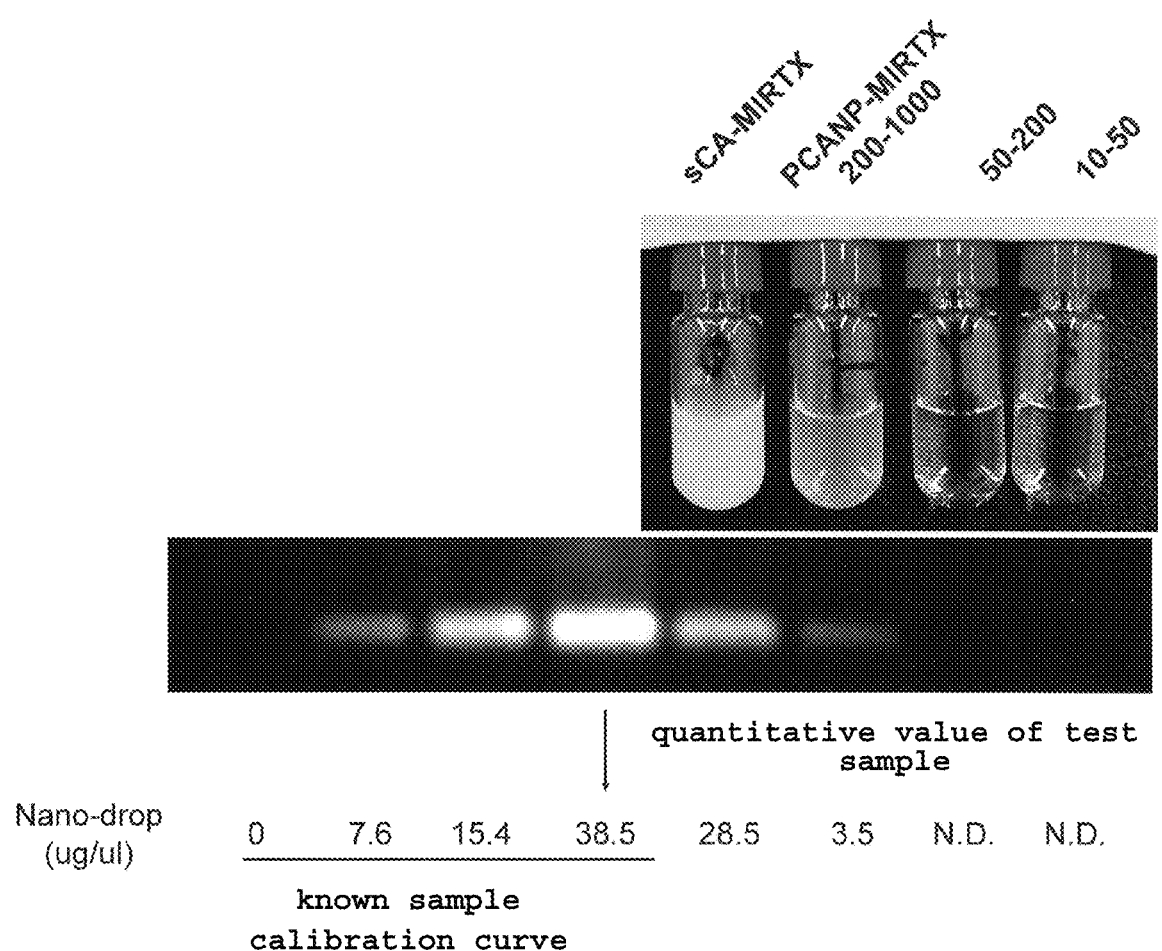
FIG. 5 Diagrams showing the measurement results of the loaded amount of nucleic acid (MIRTX) in each size fraction of sCA-MIRTX and PCANP-MIRTX. MIRTX is a microRNA having antitumor activity described in Non Patent Literature 5.

The nucleic acid amount of a sample (sCA-MIRTX) obtained by Senjyo-treating carbonate apatite particles loaded with MIRTX (complete complementary strand of miR-29b-1-5p; Mol Cancer Ther. 2018 (above)) in the absence of PEG derivative, and respective samples (PCANP-MIRTX) obtained by Covaris-treating MIRTX-loaded carbonate apatite particles in the presence of PEG derivative (SUNBRIGHT ME-100CS), followed by size fractionation into three as mentioned above was measured using ultra-microvolume spectrophotometer NanoDrop (Thermo Scientific). The results are shown in FIG. 5. The nucleic acid amount of sCA-MIRTX was 28.5 µg, whereas the nucleic acid amount of PCANP-MIRTX was 3.5 µg (about one-eighth that of sCA-MIRTX) in 200 to 1,000 nm-sized particles. Nucleic acids in 50 to 200 nm and 10 to 50 nm sized particles were below the detection limit.

The amount of nucleic acid was also assumed by agarose gel electrophoresis and it was confirmed that the results were the same.

(3-2) In Vivo Functional Evaluation

Figure 6:
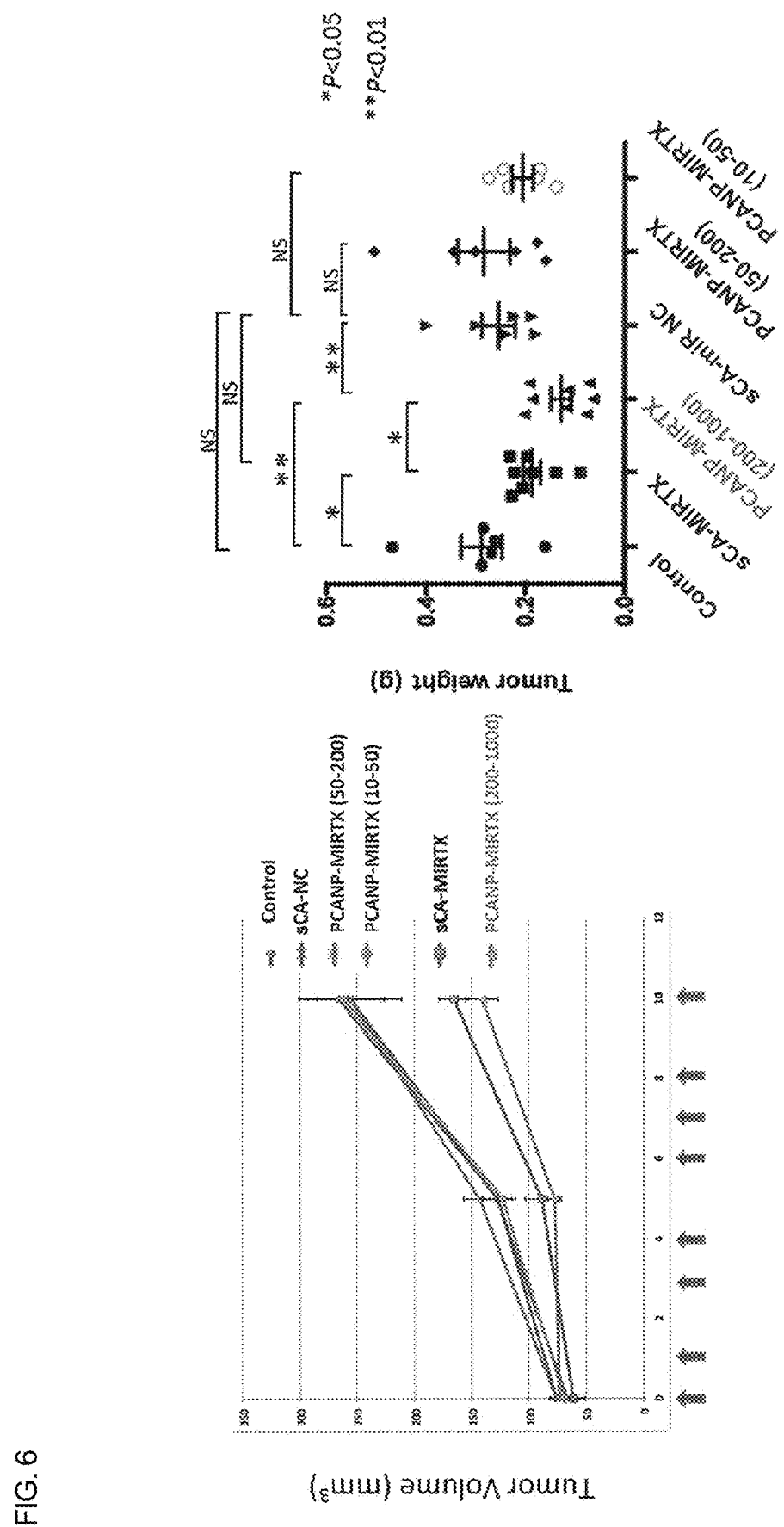
FIG. 6 Diagrams showing the antitumor effect of each size fraction of sCA loaded with MIRTX and PCANP-MIRTX.

MIRTX-sensitive pancreatic cancer cells panc1 were subcutaneously implanted into nude mice to create subcutaneous tumors (2 tumors/mouse). The antitumor effect was compared and examined in the following 6 groups.
1) Control (non-administration) group: 3 mice, 6 tumors
2) sCA-miR NC (Senjyo-treated carbonate apatite particles loaded with negative control miRNA in the absence of PEG derivative) administration group: 3 mice, 6 tumors
3) sCA-MIRTX administration group: 4 mice, 8 tumors
4) PCANP-MIRTX (200-1000) administration group: 4 mice, 8 tumors
5) PCANP-MIRTX (50-200) administration group: 3 mice, 6 tumors
6) PCANP-MIRTX (10-50) administration group: 3 mice, 6 tumors 20 µg/dose was administered to the sCA-miR NC and sCA-MIRTX administration groups, 2.5 µg/dose was administered to the PCANP-MIRTX (200-1000) administration group, and nucleic acid below the detection sensitivity was administered to the PCANP-MIRTX (50-200) and PCANP-MIRTX (10-50) administration groups, each from the tail vein a total of 8 times on days 0, 1, 3, 4, 6, 7, 8, and 10. The results are shown in FIG. 6.

The PCANP-MIRTX (200-1000 nm) administration group showed significantly smaller tumor weight on day 12 than the Control (non-administration) group, sCA-miR NC administration group, and sCA-MIRTX administration group (P values were <0.01, <0.01, <0.05, respectively).

On the other hand, the sCA-MIRTX administration group showed significantly smaller tumors than the non-administration group, but no significant difference was found from sCA-miR NC.

The PCANP-MIRTX (50-200) administration group and PCANP-MIRTX (10-50) administration group showed no significant difference in tumor weight from the non-administration group and sCA-miR NC administration group.

Figure 7:
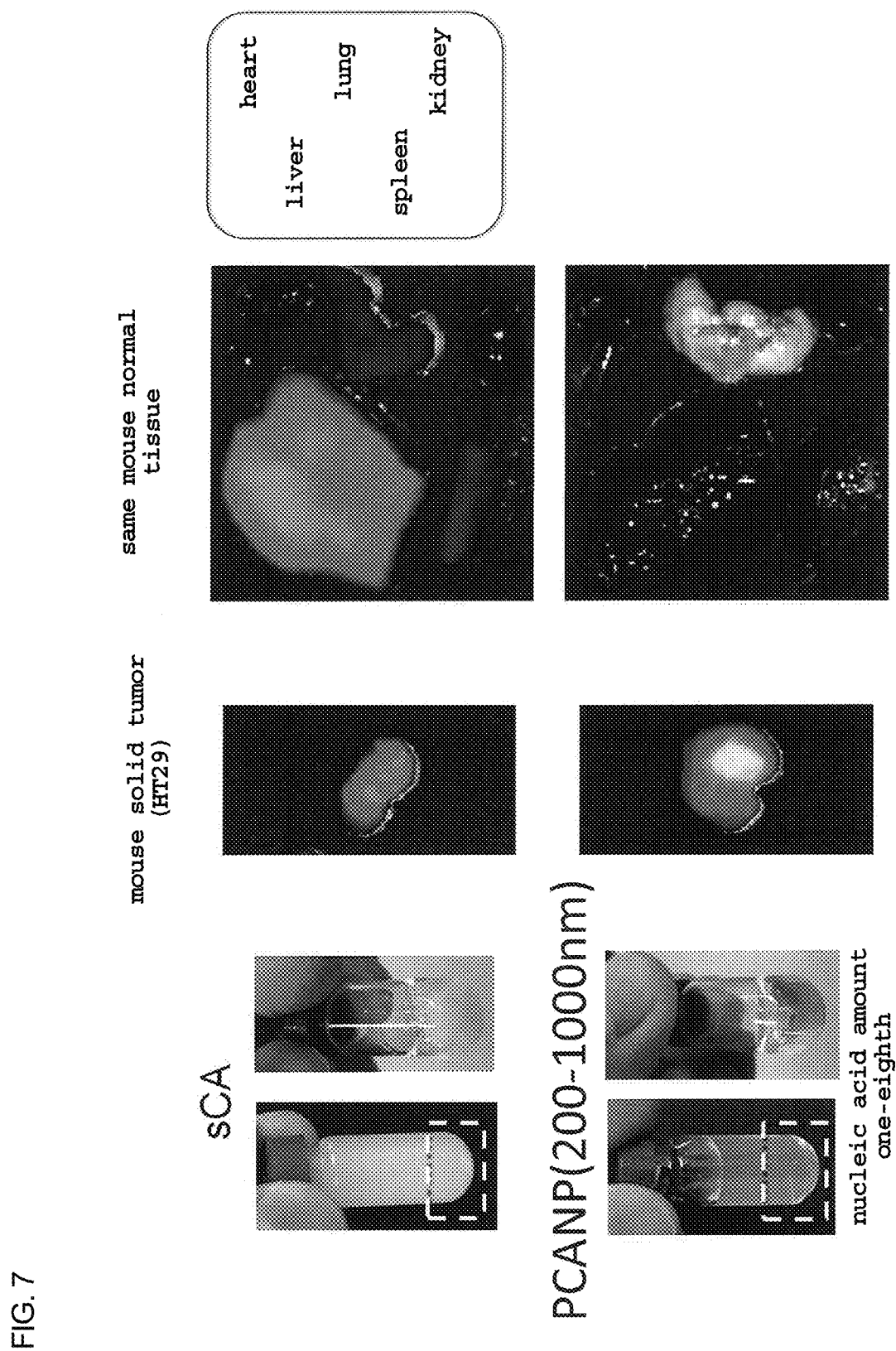
FIG. 7 Diagrams showing the uptake of Alexa750-labeled NC (Negative Control) siRNA loaded on the 200 to 1,000 nm size fractions of sCA and PCANP into tumor and normal organs.

Then, a sample (sCA) obtained by Senjyo-treating carbonate apatite particles loaded with a nucleic acid fluorescently labeled with Alexa750 in the absence of PEG derivative, and a sample (PCANP-MIRTX (200-1000)) obtained by Covaris-treating fluorescent nucleic acid-loaded carbonate apatite particles in the presence of PEG derivative (SUNBRIGHT ME-100CS), followed by fractionation into 200 to 1,000 nm particles size were centrifuged and resuspended in physiological saline on the next day of particles production, and administered from the tail vein of mice each implanted with colorectal cancer cells HT-29. After 4 hours, the tumor and normal organs were excised, and fluorescence intensity was measured by IVIS. The results are shown in FIG. 7. The amount of fluorescent nucleic acid loaded on PCANP was one-eighth (5 µg) that of sCA. In tumors, it glowed in the same way as when the nucleic acid loaded on sCA (40 µg) was administered. On the other hand, the accumulation in normal organs including the liver was greatly attenuated compared to sCA.

(4) Measurement of Particle Size

Figure 8:
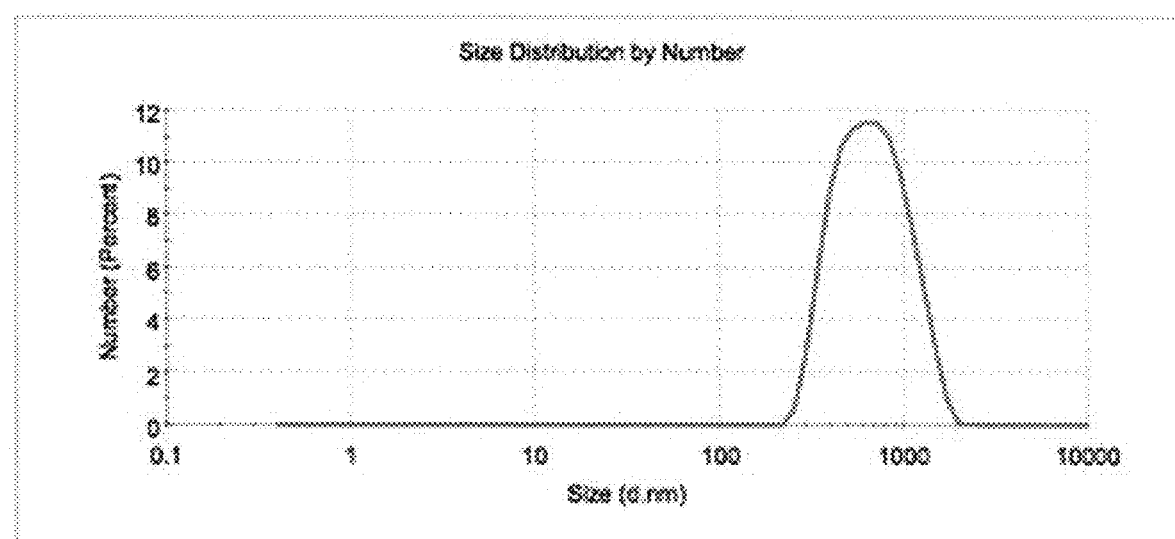
FIG. 8 A diagram showing particles size of PCANP (200-1000 nm).

The particle size distribution of PCANP (200-1000) was measured by DLS (using a zeta potential analyzer Zetasizer Nano Nano-ZS from MALVERN). As a result, a single peak with a maximum peak of 717.4 nm and an average particle size of 664.6 nm was obtained (FIG. 8).

Example 2 Production of cNaD2 Using PEG Derivative with Lower Molecular Weight

In Example 1(3), PCANP (200-1000) showed reduction in the amounts of particles and loaded nucleic acid as compared with conventional sCA (FIG. 5); however, it was found that when intravenously administered to mice, it accumulates in tumor tissues to a level equal to or greater than that of sCA and exerts antitumor activity superior to that of sCA, whereas remarkably attenuates accumulation in normal tissues as compared with sCA (FIGS. 6, 7). Carbonate apatite particles provided with such new function are referred to as cNaD1 (controlled inorganic nanoparticle drug 1). In Example 1(1), when SUNBRIGHT ME-20CS with an average molecular weight of 2,000 (NOF CORPORATION) was used as the PEG derivative, the amount of the carbonate apatite particles decreased remarkably, suggesting the possibility of the formation of particles having the same properties as cNaD1 without Covaris treatment or size fractionation. Therefore, nucleic acid-loaded carbonate apatite particles cNaD2 was formed in the presence of PEG derivative (SUNBRIGHT ME-20CS), and antitumor effect and tumor/normal organ accumulation thereof were evaluated.

(1) Preparation of cNaD2

Using SUNBRIGHT ME-20CS (NOF CORPORATION) as a PEG derivative, carbonate apatite particles were produced in the same manner as in Example 1(1). Incubation was performed at 37° C. for 60 min.

(2) Antitumor Effect (2-1) Therapeutic Effect of miR-136-Loaded cNaD2 on Colorectal Cancer DLD1

Figure 9:
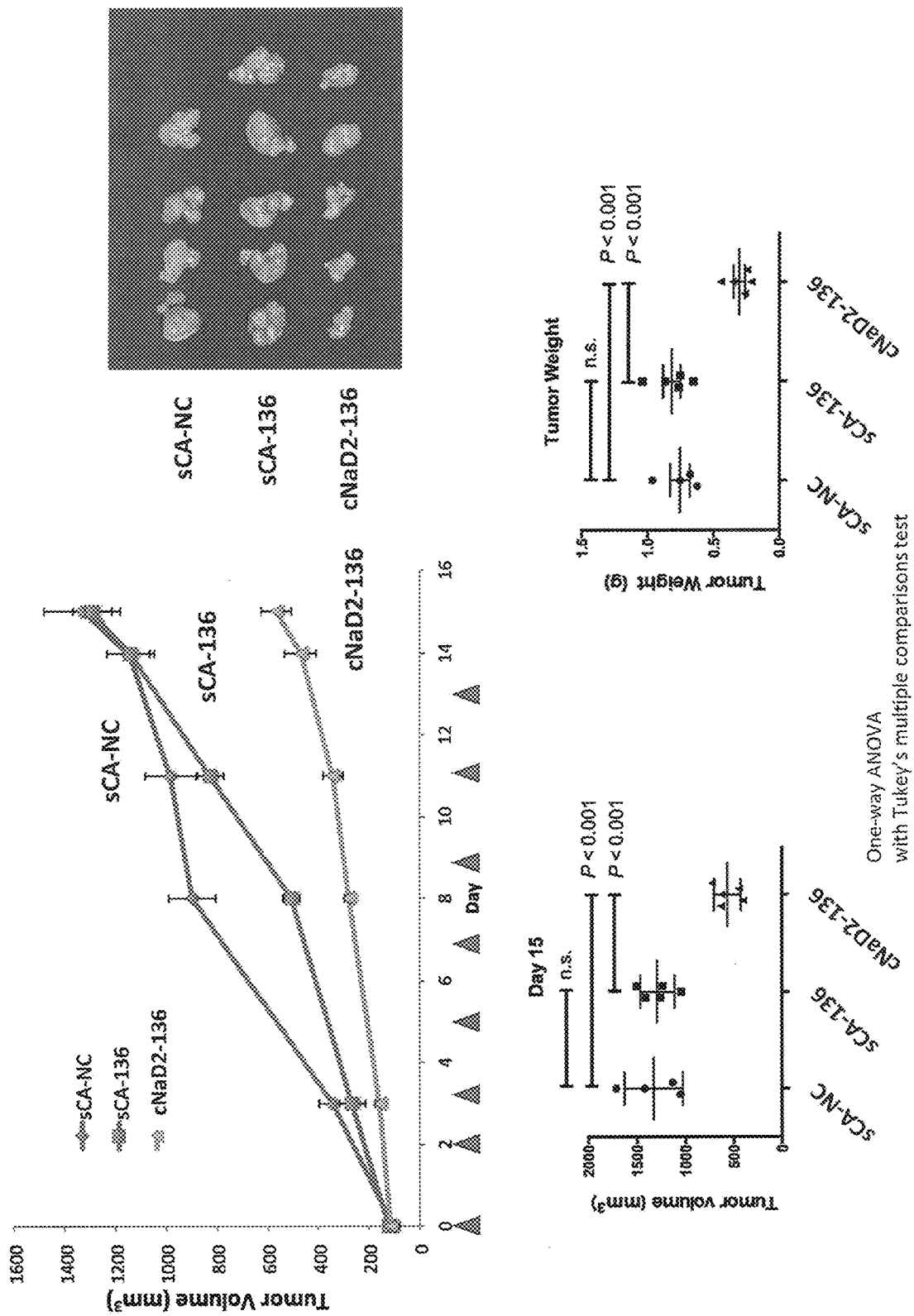
FIG. 9 Diagrams showing the therapeutic effect of miR-136 loaded on sCA and cNaD2 on colorectal cancer DLD1.

Subcutaneous tumors were created in nude mice using miR-136-sensitive colorectal cancer cells DLD1, and the antitumor effects were compared between sCA and cNaD2 (3 to 5 mice, 4 to tumors). With the time point when the tumor size reached 100 mm$^3$ as day 0, negative control miRNA-loaded sCA (sCA-NC), miRNA-136-loaded sCA (sCA-136), and miRNA-136-loaded cNaD2 (cNaD2-136) were administered from the tail vein of the nude mice. The amount of nucleic acid was 20 µg/dose for the sCA administration group and 5 µg/dose for the cNaD2 administration group, and a total of 8 doses were administered on days 0, 2, 3, 5, 7, 9, 11, and 13. The results are shown in FIG. 9. Compared with the control (sCA-NC) group, the sCA-136 group showed no significant suppression of tumor growth despite administration of 4 times the nucleic acid amount of the cNaD2-136 group. On the other hand, the tumor size and tumor weight were significantly reduced in the cNaD2-136 group, which received administration of only 5 µg each time. The amount of nucleic acid that has shown an antitumor effect with sCA-miRNA and sCA-siRNA so far was 40-50 µg. Thus, the fact that an antitumor effect was observed with only 5 µg of nucleic acid by using cNaD2 is epoch-making.

(2-2) Therapeutic Effect of cNaD2-miRNA on Large Tumors

Figure 10:
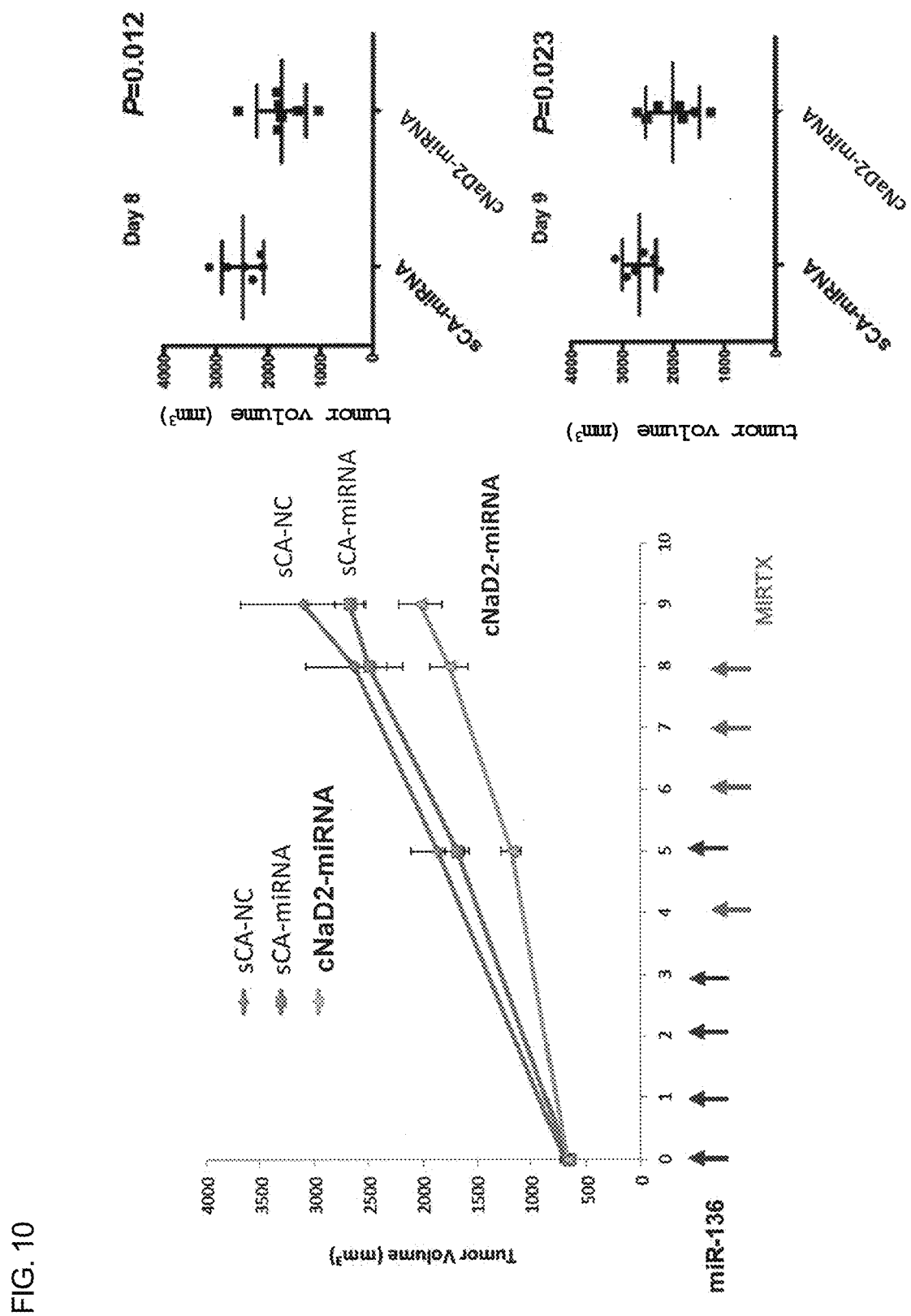
FIG. 10 Diagrams showing the therapeutic effect of microRNA loaded on cNaD2 on a large tumor (600 $mm^3$) created from PDX (patient derived xenograft) derived from colorectal cancer patients.

Using PDX (patient derived xenograft) derived from colorectal cancer patients, large subcutaneous tumors were created in nude mice and the antitumor effects were examined by comparison between sCA and cNaD2. Three sCA-NC mice, four sCA-miRNA mice, and four cNaD2 mice were prepared, and two tumors were implanted in each mouse. sCA-NC (negative control miRNA), sCA-miRNA (miR-136 or MIRTX), and cNaD2-miRNA (miR-136 or MIRTX) were injected into nude mice from the tail vein on day 0 which was when the tumor size reached as large as 600 mm$^3$. As the amount of nucleic acid, 20 µg/dose was administered a total of 9 times on days 0, 1, 2, 3, 4, 5, 6, 7, and 8 in all groups. The results are shown in FIG. 10. Compared with the control (sCA-NC) group, the sCA-miRNA group did not suppress tumor growth, but the cNaD2-miRNA group significantly reduced tumor volume on day 8 and day 9 as compared with sCA-miRNA.

(2-3) Therapeutic Effect of cNaD2-Sdc4 siRNA on Cancer Stem Cell-Model Cell

Figure 11:
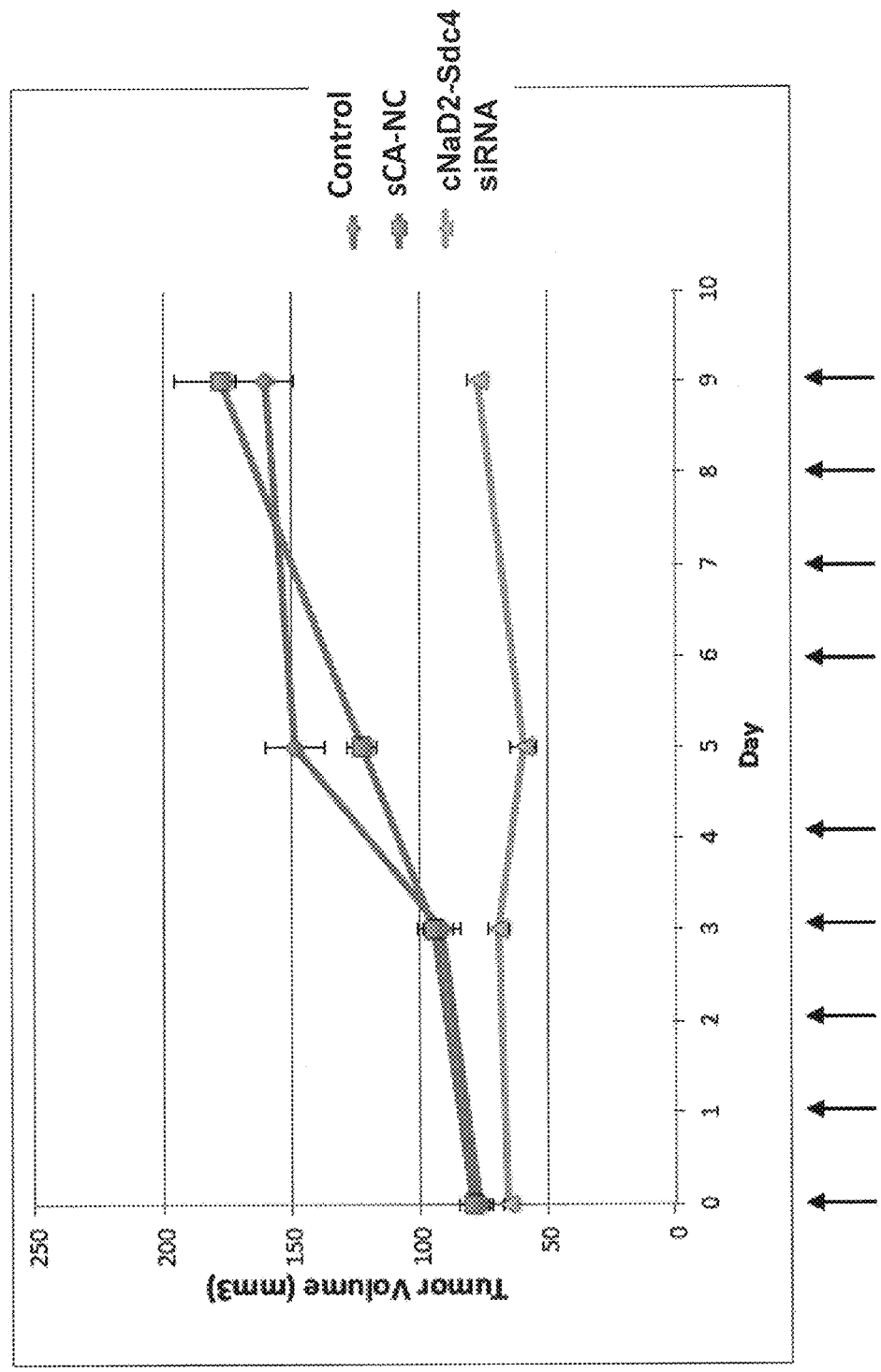
FIG. 11 A diagram showing the therapeutic effect of Sdc4 siRNA loaded on cNaD2 on cancer stem cell-model cell produced from pancreatic cancer Panc-1.

Based on the pancreatic cancer cell line Panc-1, a super cancer stem cell (super Panc-1 CSC) that can create subcutaneous tumors from a single cell in nude mice was produced. This was implanted into nude mice, and siRNA against Syndecan-4 (SDC4) loaded on cNaD2 (cNaD2-Sdc4 siRNA) was administered at a nucleic acid amount of 20 µg/dose a total of 9 times on days 0, 1, 2, 3, 4, 6, 7, 8, and 9 from the tail vein (4 mice, 8 tumors) wherein day 0 is when the tumor volume exceeded 70 mm$^3$. As the control, three super cancer stem cell-implanted mice and 6 tumors, without administration of siRNA, were used. In addition, a control group in which 20 µg/dose of negative control siRNA loaded on sCA was intravenously injected in parallel was also set (3 mice, 6 tumors). The results are shown in FIG. 11. cNaD2-Sdc4 siRNA markedly suppressed proliferation of the super cancer stem cells.

(3) Tumor/Organ Accumulation

Figures 1, 12:
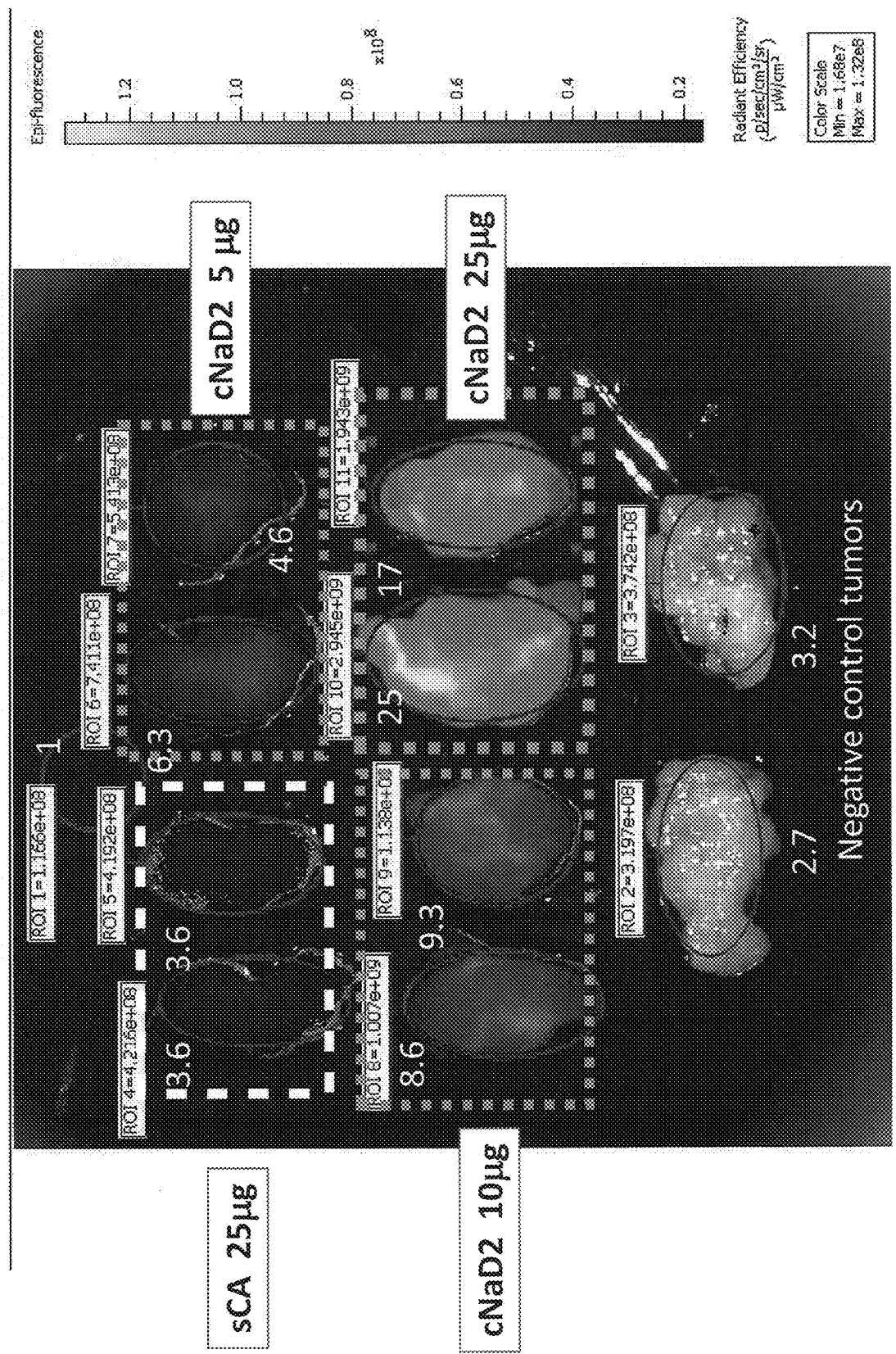
Figures 2, 12:
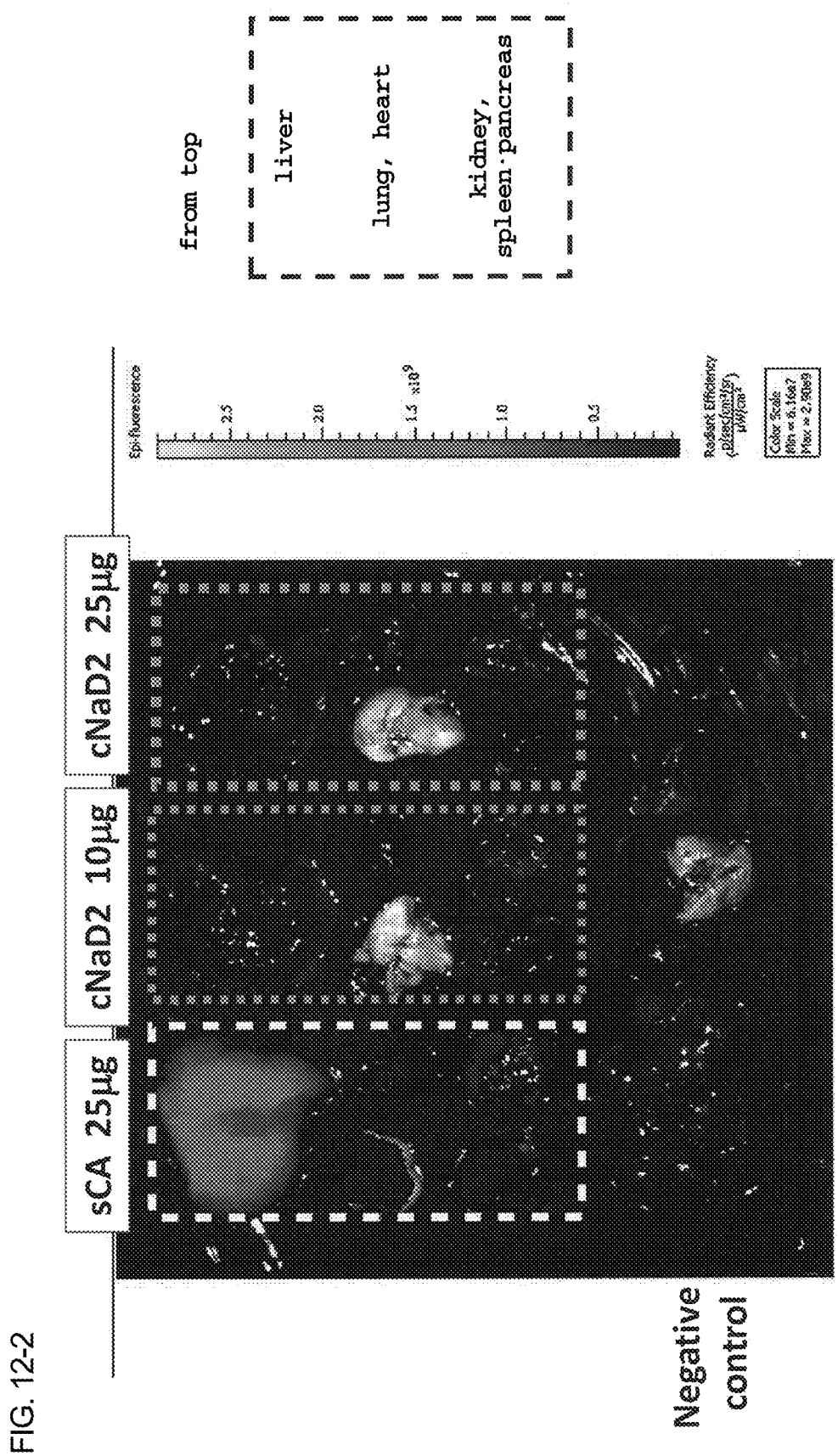

PDX (patient derived xenograft) derived from colorectal cancer patients were implanted in nude mice to create subcutaneous tumors, and 25 µg of negative control siRNA (NC siRNA) labeled with Alexa750 was loaded on sCA and injected intravenously from the tail vein. Similarly, 5, 10, and 25 µg of Alexa750-labeled NC siRNA were loaded on cNaD2 and injected intravenously. The accumulation of fluorescent nucleic acid in tumors was examined one hour later by using IVIS. As a result, when cNaD2 was used, even 5 µg of nucleic acid increased the tumor accumulation more than when 25 µg for sCA was administered, and with the same amount of 25 µg of nucleic acid as in the case of sCA, cNaD2 showed tumor accumulation not less than 5 times that of sCA (FIG. 12-1).

One hour after tail vein injection, the concentration of nucleic acid in the blood is reflected high in the liver and the like. Therefore, the accumulation of nucleic acid in normal organs was observed by IVIS 4 hours later. sCA showed accumulation in the liver, lung, kidney, and spleen, but cNaD2 showed almost no accumulation of nucleic acid (FIG. 12-2). A comparison of the average radiation efficiency reveals that administration of the same 25 µg of nucleic acid caused 10 times or more accumulation in the case of sCA than cNaD2 in the liver and 4 times or more accumulation in the lung and spleen.

(4) Measurement of Particle Size

Figure 13:
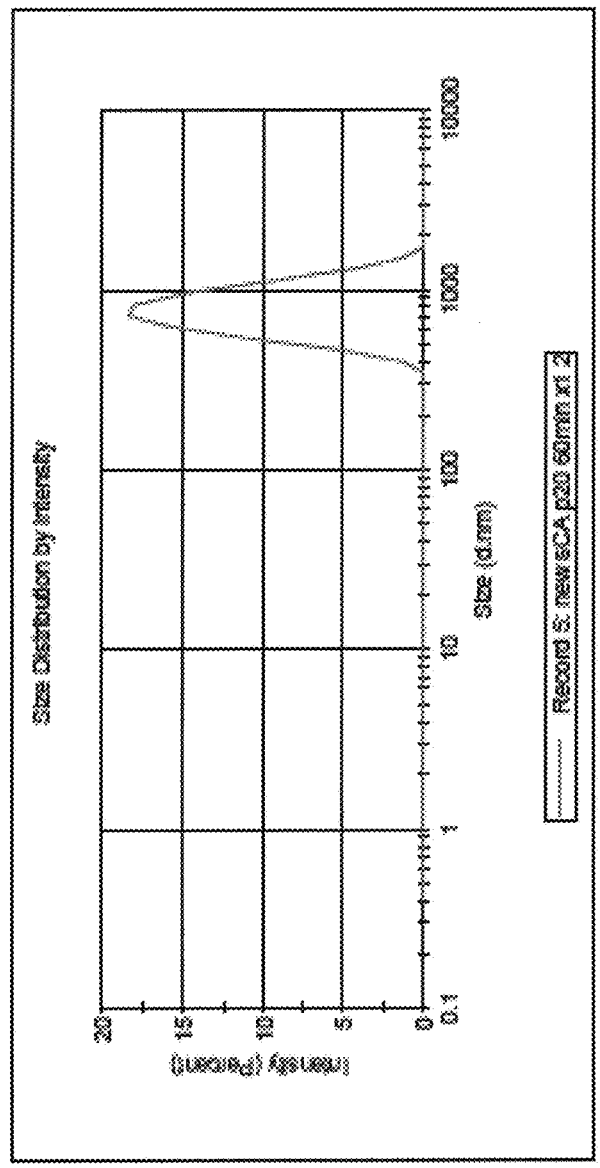
FIG. 13 A diagram showing particle size of cNaD2.

The particle size distribution of cNaD2 was measured by DLS (using a zeta potential analyzer Zetasizer Nano Nano-ZS from MALVERN). As a result, a single peak with a maximum peak of 793.4 nm and an average particle size of 740.0 nm was obtained (FIG. 13).

(5) Effect of Time after Dissolution of PEG on Nucleic Acid Loading Capacity of Particles In cNaD2, the particle performance as time lapses after dissolution of PEG derivative was examined over time.

To 300 mL of distilled water, 1.11 g of NaHCO$_3$, 1 M NaH$_2$PO$_4$·2H$_2$O (270 µL), and 1 M CaCl$_2$ (540 µL) were added and dissolved therein, and the pH of the mixture was adjusted to 7.4. 25 mL of the buffer solution was dispensed into a 50 mL Falcon tube, and 0.5 mL (50 µg) of 0.1 mg/mL PEG derivative (SUNBRIGHT ME-20CS (NOF CORPORATION)) was added. As the PEG derivative solution, 6 kinds of solutions at 5 min, 1 hr, 8 hr, 1 day, 2 days, and 3 days after dissolving the PEG derivative in water were used. 10 µg/µL of negative control siRNA (NC siRNA) (53.2 µg) and 1 M CaCl$_2$ (100 µL) (Ca amount was total 5.8 mg) were added and the mixture was stirred and incubated at 37° C. for 60 min. For comparison, carbonate apatite particles (sCA) without PEG derivatives were similarly prepared. After completion of the incubation, the mixture was centrifuged at 4° C., 12,000 rpm, the supernatant was removed, the particles were collected with 0.5 mL of physiological saline (pH 8), and the Ca concentration and nucleic acid concentration were measured. The results are shown in Table 3. The nucleic acid load of cNaD2 increased with the passage of time after dissolution of the PEG derivative, and the amount of nucleic acid per amount of Ca (NA/Ca ratio) was particularly high two to three days after dissolution of the PEG derivative.

TABLE 3

|  | 5 min | 1 h | 8 h | 1 d | 2 d | 3 d |
| --- | --- | --- | --- | --- | --- | --- |
| input amount of NC siRNA (µg) | 53.2 | 53.2 | 53.2 | 53.2 | 53.2 | 53.2 |
| NA uptake (µg) | 29.6 | 30.7 | 28.7 | 22.6 | 16.8 | 19.8 |
| input amount of Ca (mg) | 5.8 | 5.8 | 5.8 | 5.8 | 5.8 | 5.8 |
| Ca uptake (mg) | 0.21 | 0.19 | 0.19 | 0.14 | 0.07 | 0.08 |
| NA/Ca (µg/mg) | 140.7 | 157.3 | 151.3 | 163.1 | 234.3 | 245.4 |

As the PEG derivative solution, 3 kinds of solutions at 15 min, 1 day, and 2 days after dissolving the PEG derivative in water were used and similar experiment was performed. Particle performance was compared with particles formed in the absence of the PEG derivative (sCA). The results are shown in Table 4. cNaD2 showed remarkably higher nucleic acid load than sCA. As expected, the amount of nucleic acid loaded increased with the passage of time after dissolution of the PEG derivative, and in particular, the NA/Ca ratio was the highest two days after dissolution of the PEG derivative.

TABLE 4

|  | iNaD2 | | | sCA |
| --- | --- | --- | --- | --- |
|  | 15 min | 1 d | 2 d | sCA |
| input amount of NC siRNA (µg) | 53.2 | 53.2 | 53.2 | 53.2 |
| NA uptake (µg) | 26.2 | 10.7 | 15.0 | 19.3 |
| input amount of Ca (mg) | 5.8 | 5.8 | 5.8 | 5.8 |
| Ca uptake (mg) | 0.118 | 0.040 | 0.044 | 0.376 |
| NA/Ca (µg/mg) | 221.5 | 266.9 | 341.1 | 51.4 |

Example 3 Production of cNaD (cNaD3 to cNaD6) Using PEG Derivatives with Carboxylic Acid at the End Thereof (1) Nucleic Acid Loading Capacity of Particles Using Monomethyl Monocarboxylic Acid PEG In Examples 1 and 2, a PEG derivative having an ester of carboxylic acid and N-succinimide (NHS) at the end thereof was used. The amount of nucleic acid in PCANP2 particles formed increases with the passage of time after dissolution of PEG derivative, suggesting the possibility that the esters at the end are gradually hydrolyzed and the nucleic acid loading capacity of particles increases as more molecules have free carboxylic acid at the end thereof.

Figure 14:
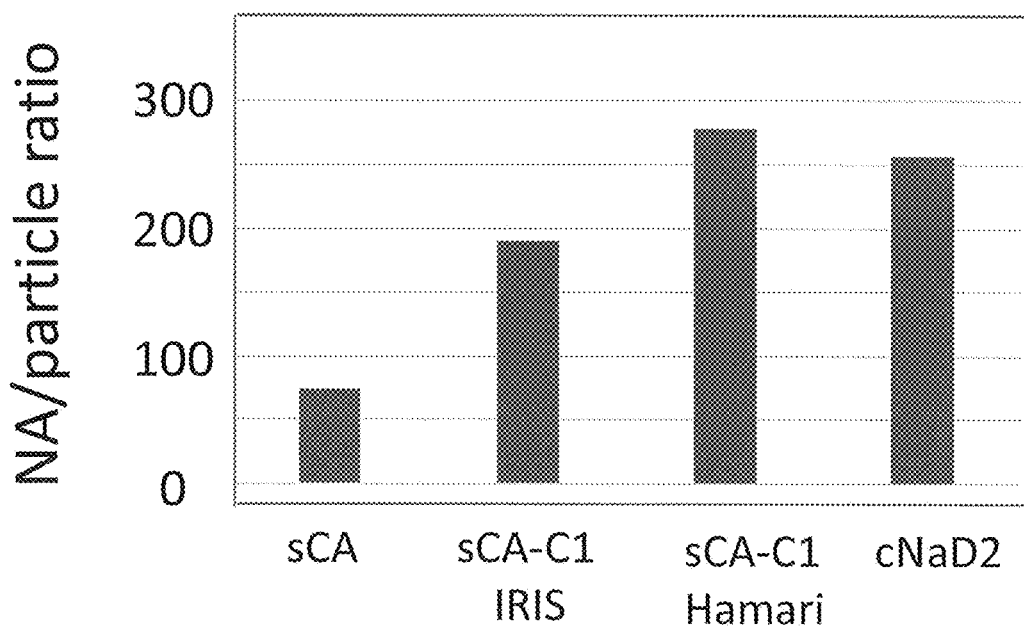
FIG. 14 Diagrams showing comparison of nucleic acid amounts loaded on carbonate apatite particles (sCA-C1-Iris, sCA-C1-Hamari) produced in the presence of monomethyl monocarboxylic acid PEG, cNaD2, and sCA. The upper figure shows the amount of nucleic acid per amount of particles, and the lower figure shows the amount of nucleic acid per amount of Ca.
Figure 14:
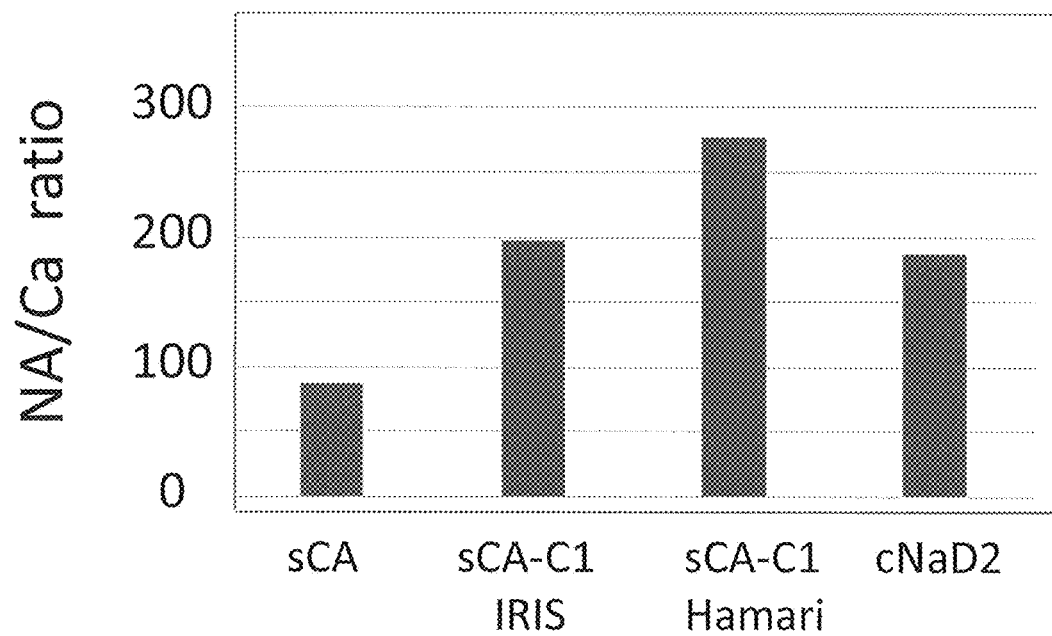

Therefore, commercially available methoxy PEG-OH (2 kDa) was reacted with succinic anhydride to synthesize monomethyl monocarboxylic acid PEG (C1-Iris, C1-Hamari) having the same structure as the hydrolysate of SUNBRIGHT ME-20CS (NOF CORPORATION) (Iris and Hamari indicate the names of companies that produced monomethyl monocarboxylic acid PEG; hereinafter the same), particles were formed in the same manner as in Example 2(5) (collectively referred to as cNaD3, cNaD3: $CH_3O(CH_2CH_2O)_n$—$CO(CH_2)_2COOH$ (average molecular weight 2000)), and the nucleic acid loading capacity was compared with sCA and cNaD2. The results are shown in FIG. 14. It was shown that monomethyl monocarboxylic acid PEG (C1-Iris, C1-Hamari) has a nucleic acid loading capacity equal to or greater than that of cNaD2, and can load remarkably large amount of nucleic acid than sCA.

(2) Tumor/Normal Organ Accumulation of Particles Using Monomethyl Monocarboxylic Acid PEG Using monomethyl monocarboxylic acid PEG (Handai-C1, Hamari-C1: cNaD3), particles loaded with NC siRNA labeled with Alexa750 were produced and administered from the tail vein to nude mice subcutaneously implanted with colorectal cancer-derived PDX. For comparison, sCA particles formed in the absence of PEG derivative, particles formed using HO-PEG-OH (Sigma), and sCA particles with PEG-modified surface (Pegylation) were similarly administered to tumor-bearing mice. The Ca concentration and the nucleic acid concentration were measured for each sample, and administration was performed by adjusting the amount of Ca or the amount of nucleic acid. Accumulation in tumors was observed 1 hr later, and accumulation in normal organs was observed 4 hr later by IVIS.

Figures 1, 15:
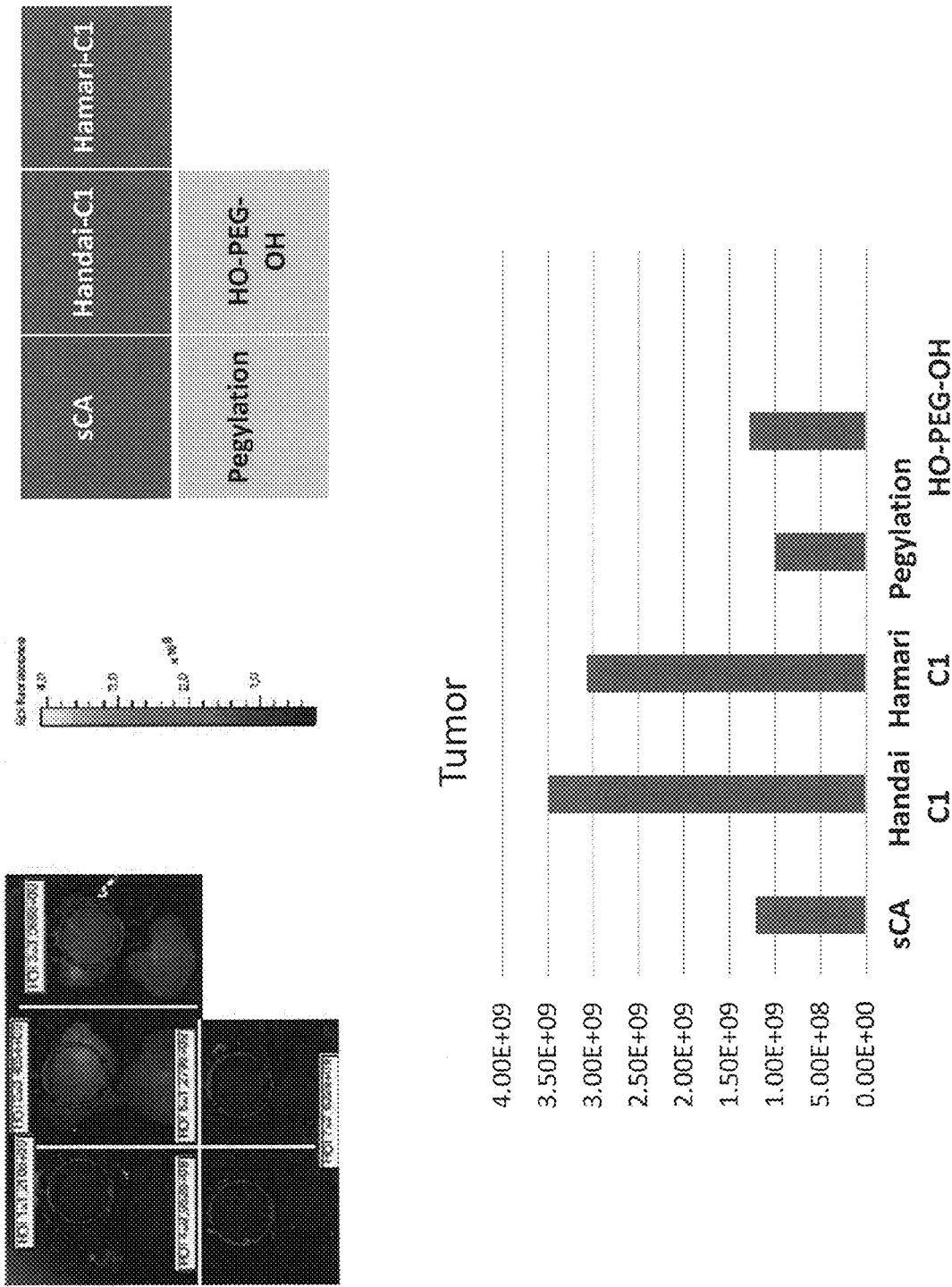
Figures 2, 15:
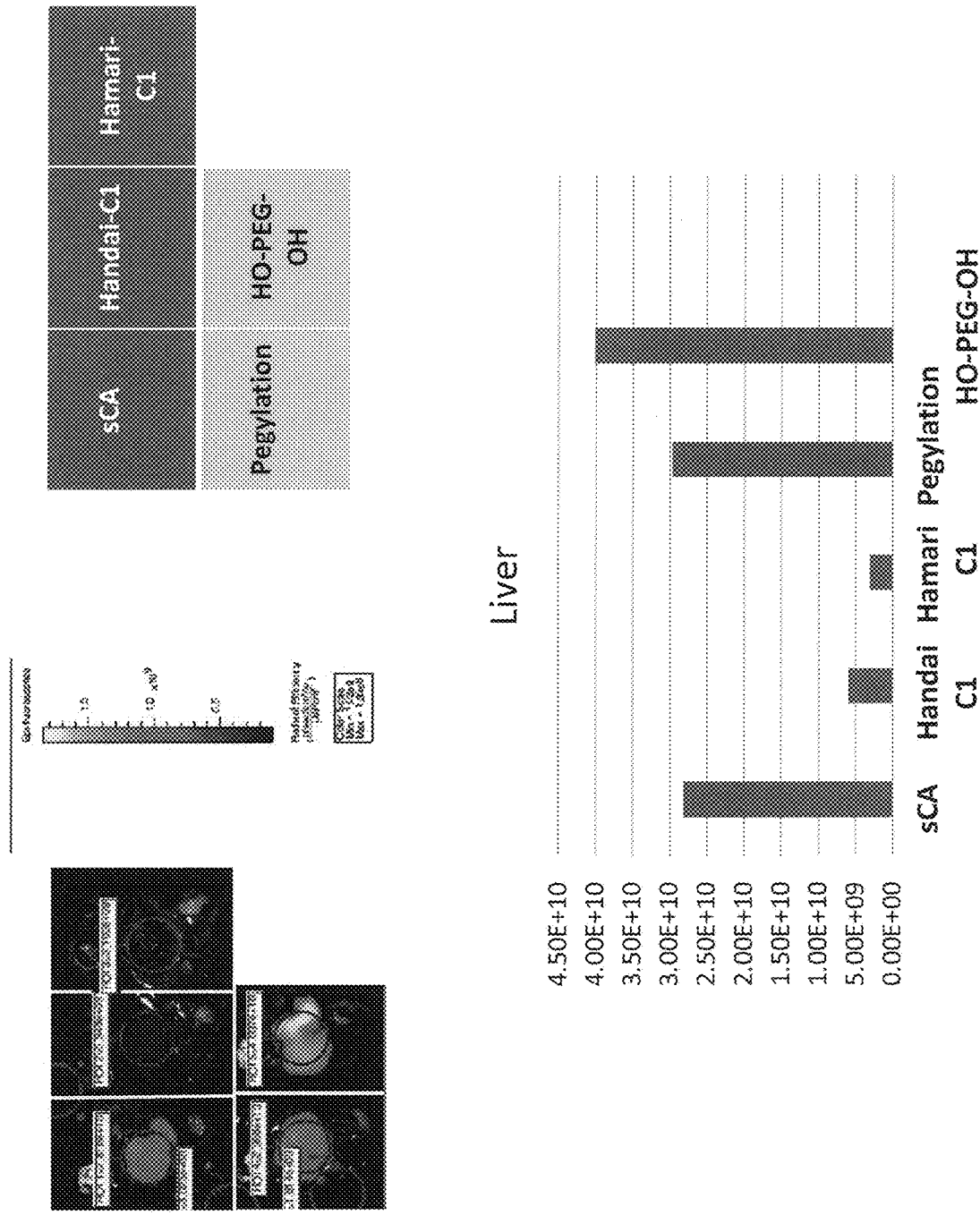

The results of administration with a constant amount of Ca (0.1 mg) are shown in FIGS. 15-1 and 15-2. Particles produced using monomethyl monocarboxylic acid PEG (Handai-C1, Hamari-C1) showed about three times the accumulation of sCA (FIG. 15-1). On the other hand, in the sCA, Pegylation, and HO-PEG-OH group, accumulation in normal organs including the liver was observed, but accumulation of nucleic acid was low with monomethyl monocarboxylic acid PEG (FIG. 15-2). A comparison of average radiation efficiency reveals that monomethyl monocarboxylic acid PEG showed one-fifth or lower accumulation in the liver than sCA. The dose in each group with the constant amount of Ca is shown in Table 5. The monomethyl monocarboxylic acid PEG showed a higher NA/Ca ratio as compared with sCA and more nucleic acid was administered (Table 5).

TABLE 5

|  | sCA | Handai-C1 | Hamari-C1 | HO-PEG-OH | Pegylation |
|---|---|---|---|---|---|
| Ca (mg/ml) | 0.550 | 0.236 | 0.285 | 0.566 | 0.582 |
| 0.1 mg Ca injection (ml) | 0.182 | 0.424 | 0.351 | 0.177 | 0.172 |
| NA (µg/ml) | 46.92 | 34.2 | 45.24 | 62.64 | 49.44 |
| NA/Ca | 85.364 | 144.878 | 158.777 | 110.734 | 84.972 |
| injected NA (µg) | 8.536 | 14.488 | 15.878 | 11.073 | 8.497 |

Figures 1, 16:
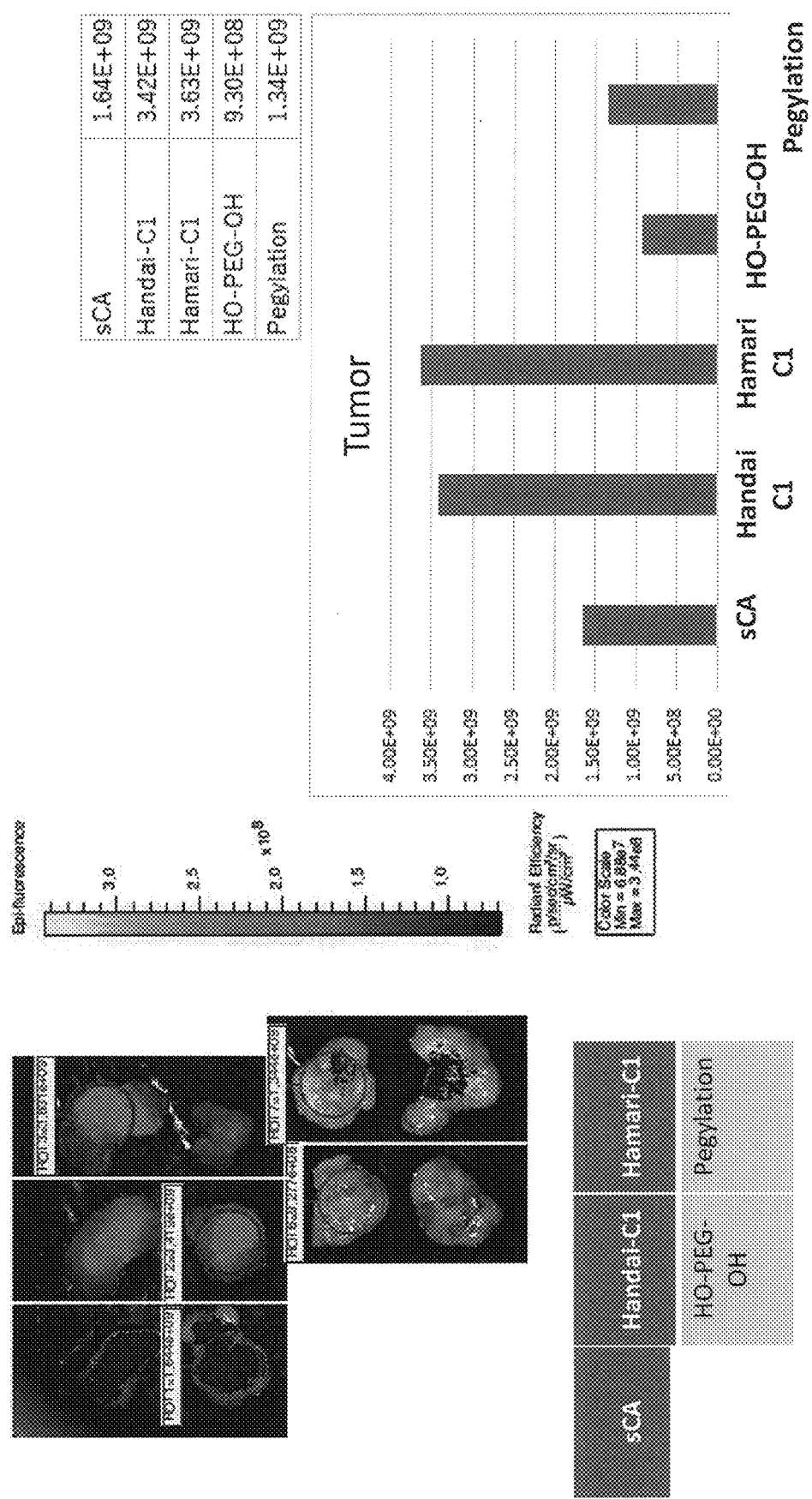
Figures 2, 16:
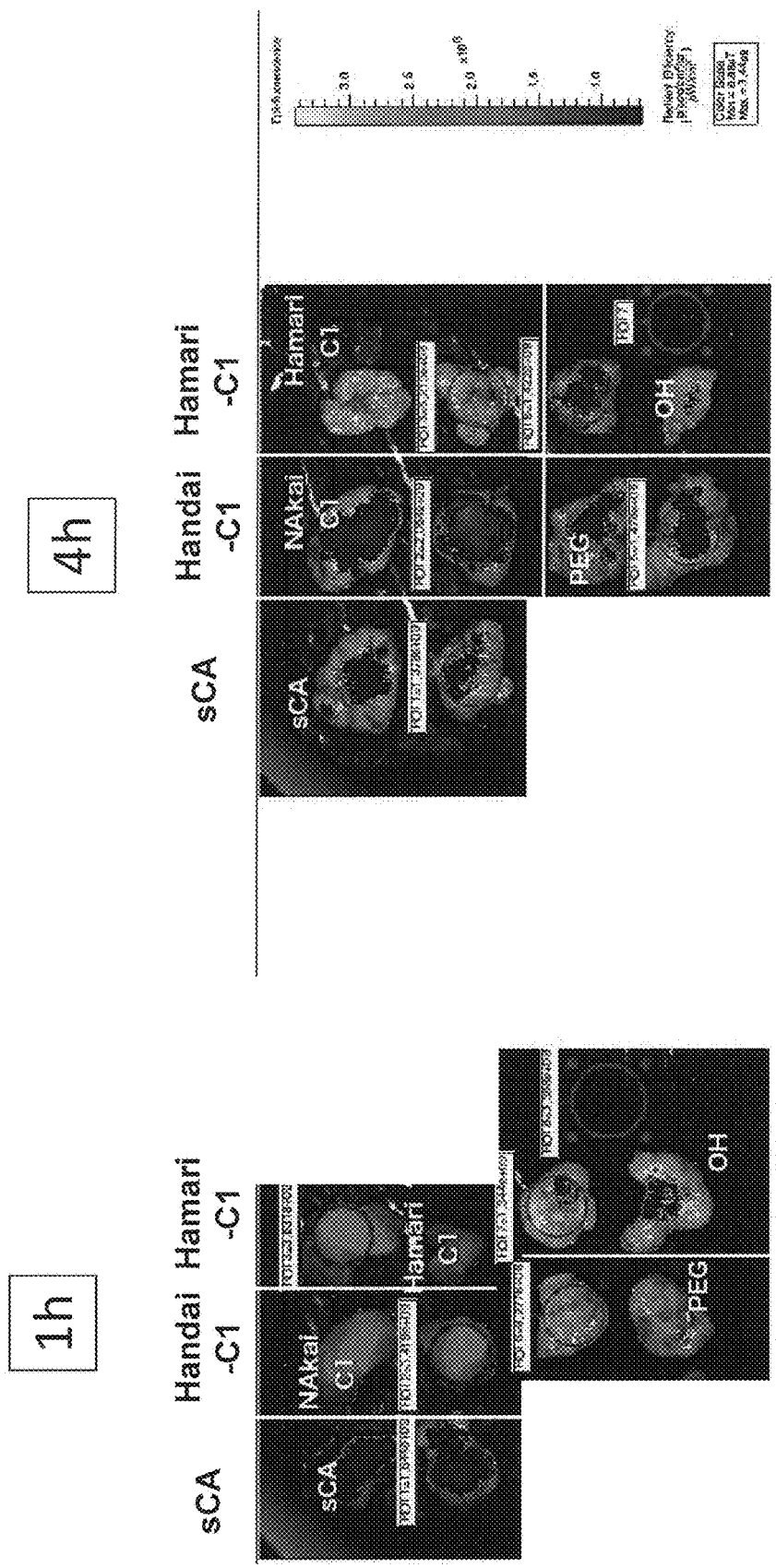
Figures 3, 16:
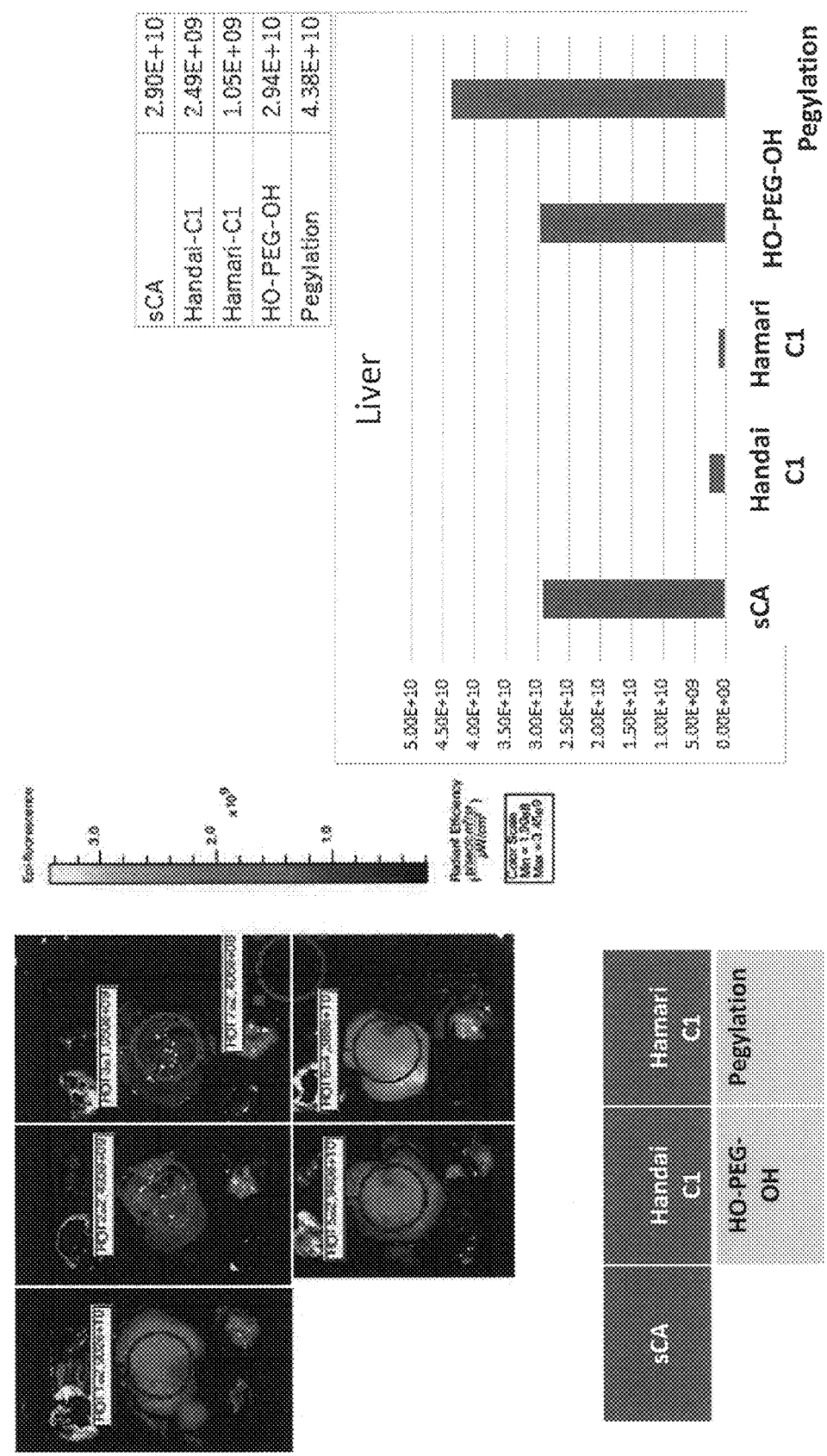
Figures 4, 16:
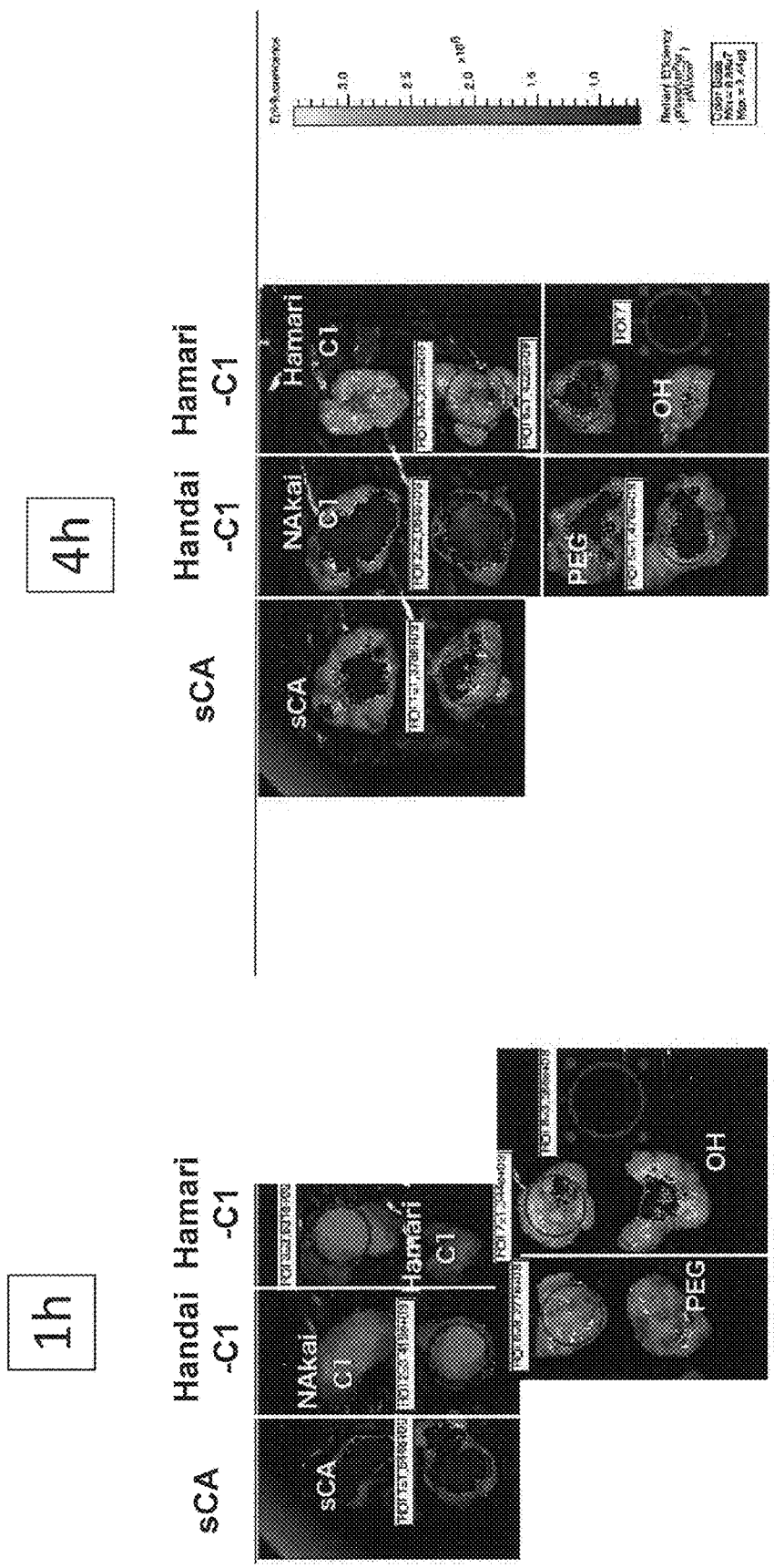

The results of administration with a constant amount of nucleic acid (15 µg) are shown in FIGS. 16-1 to 16-4. The nucleic acid concentration was measured using NanoDrop, and it was confirmed by IVIS before administration that the amount of fluorescence contained inside the particles was equivalent.

Particles produced using monomethyl monocarboxylic acid PEG (Handai-C1, Hamari-C1) showed about two times or more accumulation than sCA in tumors 1 hr later (FIG. 16-1). Accumulation in tumors was attenuated 4 hr later (FIG. 16-2). On the other hand, in the sCA, Pegylation, and HO-PEG-OH group, accumulation in normal organs including the liver was observed 4 hr later, but accumulation of nucleic acid was low with monomethyl monocarboxylic acid PEG (FIG. 16-3). A comparison of average radiation efficiency reveals that monomethyl monocarboxylic acid PEG showed one-10th or lower accumulation in the liver than sCA. One hour later, sCA, Pegylation, and HO-PEG-OH group showed higher accumulation, but accumulation of nucleic acid was low with monomethyl monocarboxylic acid PEG (FIG. 16-4).

(3) Production of cNaD4 to cNaD6

Since the effect of the PEG derivative cNaD3 with a carboxylic acid at the end thereof was shown, carbonate apatite particles (cNaD4 to cNaD6) were newly produced in the same manner as in Example 1(1), using the following three types of PEG derivatives having monocarboxylic acid or dicarboxylic acid so at the end thereof.

1) cNaD4: $CH_3O(CH_2CH_2O)_n$—$(CH_2)_2NHCO(CH_2)_2$—COOH (average molecular weight 2000)
2) cNaD5: $CH_3O(CH_2CH_2O)_n$—$CH_2COOH$ (average molecular weight 2000)
3) cNaD6: HOOC$(CH_2)_2COO$—$(CH_2CH_2O)_n$—$CO(CH_2)_2$—COOH (average molecular weight 2000))

Figure 17:
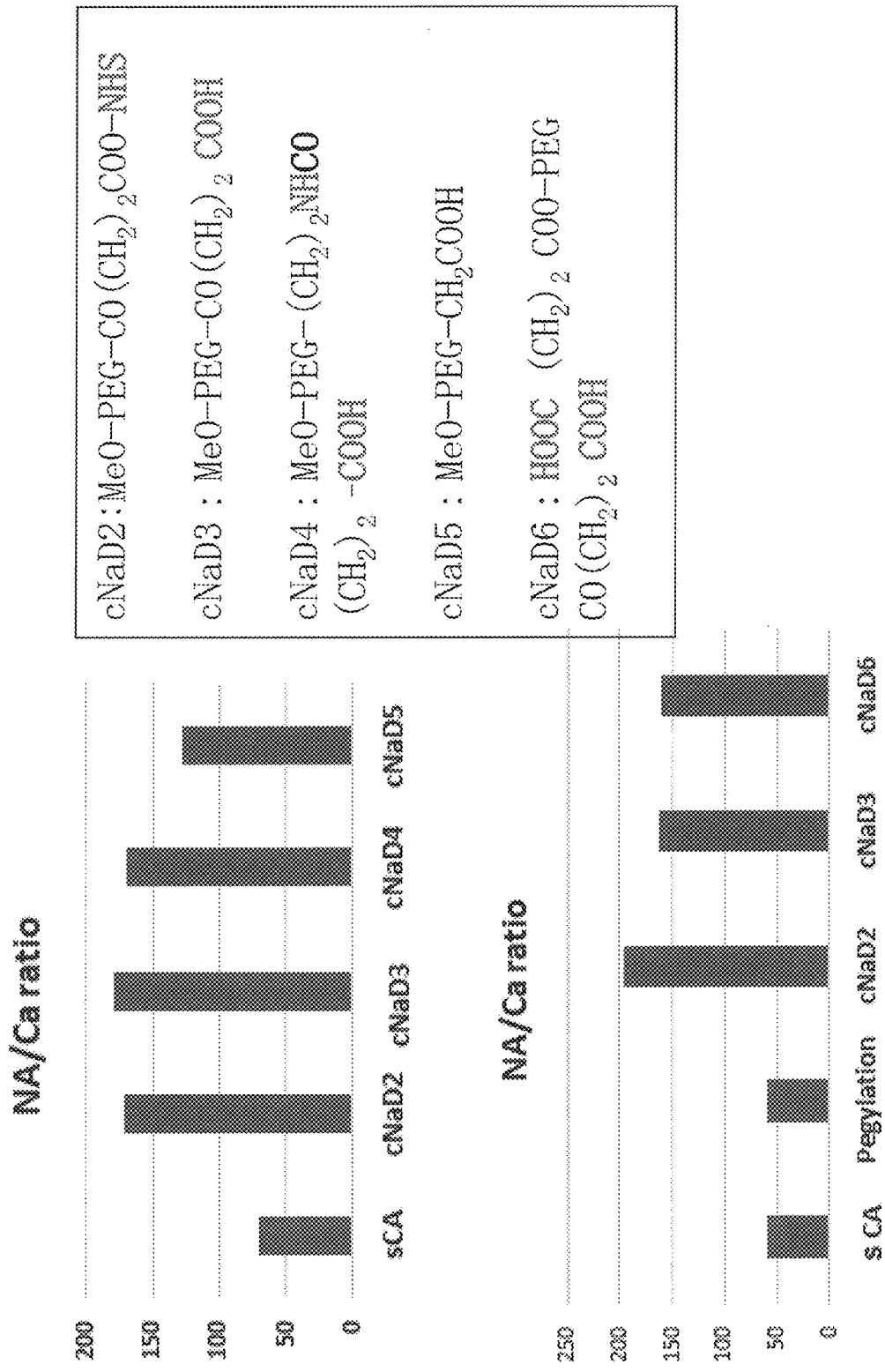
FIG. 17 Diagrams showing the ratios (μg/mg) of nucleic acid and calcium that constitute sCA, sCA particles with PEG-modified surface (Pegylation), and respective particles of cNAD3 to cNAD6.

The ratio of the amount of nucleic acid uptake to the amount of calcium in the particles (NA/Ca ratio) in cNaD4 (amide bond exists between PEG and carboxyl group) was of the same level as that of cNaD3 (ester bond exists between PEG and carboxyl group). In cNaD5, the ratio reduced slightly but was still about twice that of sCA. Even cNaD6 produced using a dicarboxylic acid PEG derivative having carboxyl groups at both ends of PEG achieved a high NA/Ca ratio of the same level as that of cNaD3 (FIG. 17).

(2) Tumor/Normal Organ Accumulation of Particles Using Dicarboxylic Acid PEG

Figure 18:
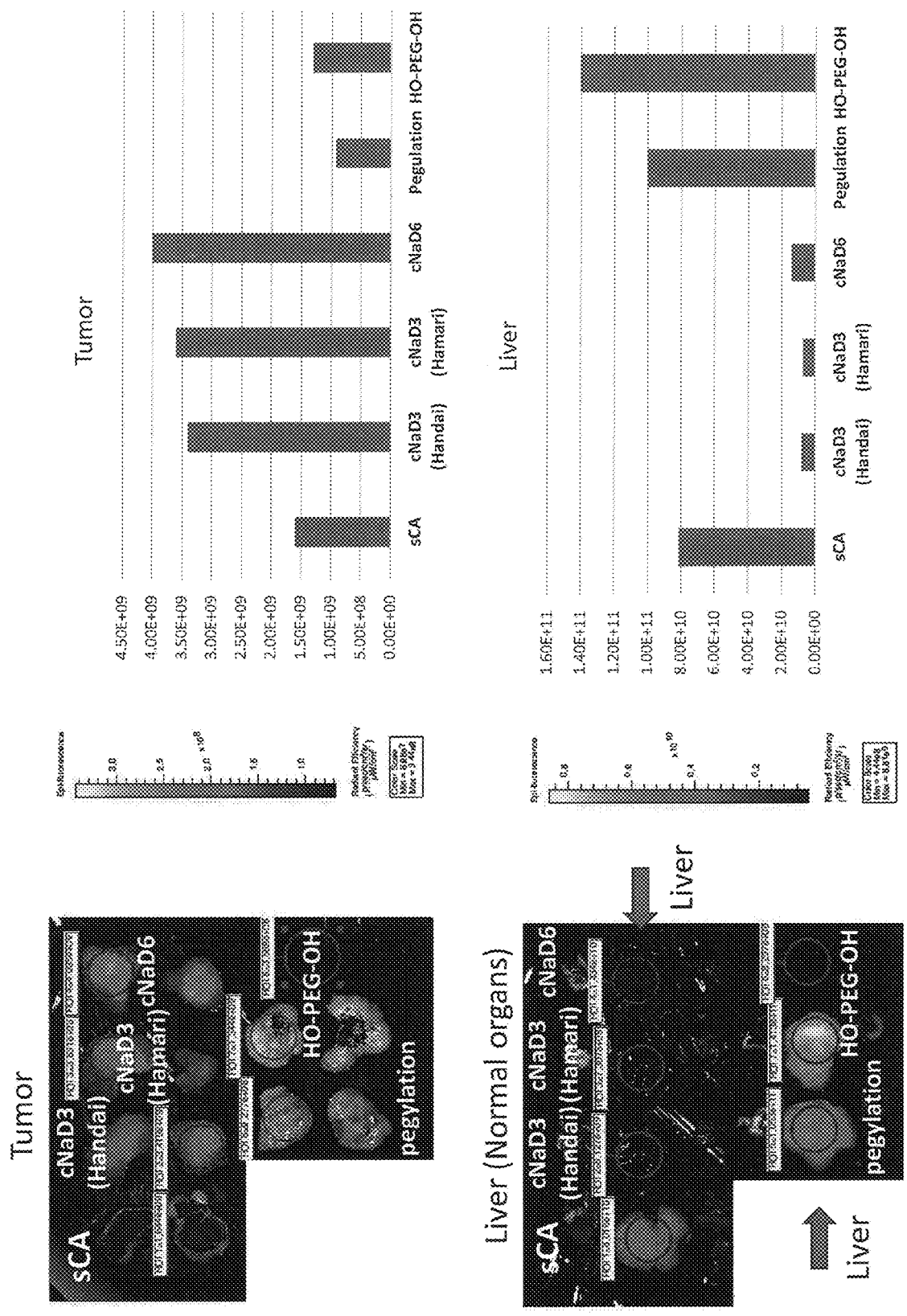
FIG. 18 Diagrams showing that carbonate apatite particles (cNaD6) produced in the presence of dicarboxylic acid PEG show accumulation in tumors and the livers similar to carbonate apatite particles (cNaD3) produced in the presence of monomethyl monocarboxylic acid PEG. The figures show accumulation of nucleic acid when Alexa750-labeled NC siRNA was loaded and administered with a constant amount of nucleic acid (15 μg) to tumor-bearing mice.

Using dicarboxylic acid PEG, particles loaded with NC siRNA labeled with Alexa750 were produced and administered from the tail vein to nude mice subcutaneously implanted with colorectal cancer-derived PDX. For comparison, cNaD3, sCA particles formed in the absence of PEG derivative, particles formed using HO-PEG-OH (Sigma), and sCA particles with PEG-modified surface (Pegylation) were similarly administered to tumor-bearing mice. The Ca concentration and the nucleic acid concentration were measured for each sample, and administration was performed with a constant amount (15 μg) of nucleic acid. Accumulation in tumors and normal organs was observed 1 hr later by IVIS. The results thereof are shown in FIG. 18.

Particles produced using dicarboxylic acid PEG (cNaD6) showed accumulation equivalent to that of cNaD3 (2 times or more that of sCA). On the other hand, in the sCA, Pegylation, and HO-PEG-OH group, accumulation in normal organs including the liver was observed, but accumulation of nucleic acid was low with cNaD6, similar to that of cNaD3. A comparison of average radiation efficiency reveals that dicarboxylic acid PEG, like monomethyl monocarboxylic acid PEG, showed one-fifth or lower accumulation in the liver than sCA.

(5) Antitumor Activity of cNaD3

Figure 19:
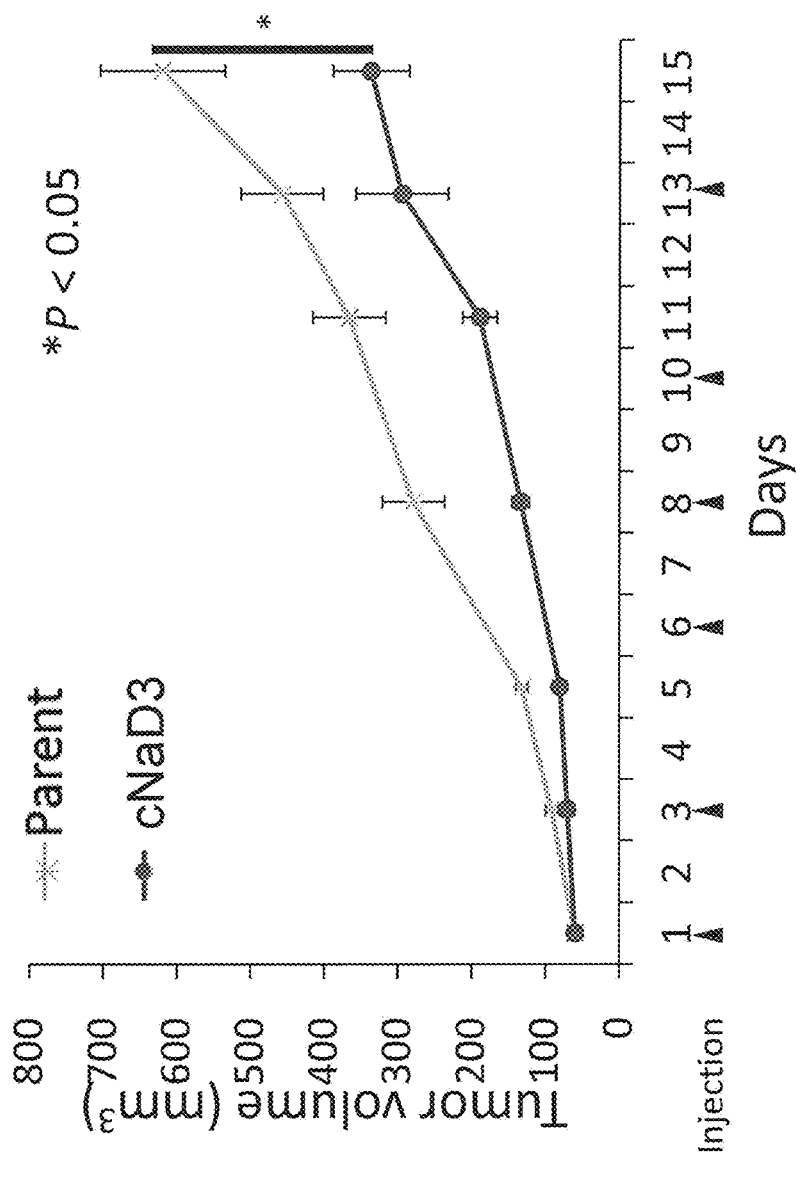
FIG. 19 A diagram showing the therapeutic effect of MIRTX loaded on cNaD3 on colorectal cancer DLD1.

MIRTX-loaded carbonate apatite particles (cNaD3) were produced and administered to nude mice (4 mice, 2 tumors/mouse) subcutaneously implanted with MIRTX-sensitive colorectal cancer cells DLD1, and the antitumor effects were examined. With the time point when the tumor size reached 60 mm$^3$ as day 1, MIRTX-loaded cNaD3 was administered from the tail vein of the mice. The amount of nucleic acid was 25 μg/dose and a total of 6 doses were administered on days 1, 3, 6, 8, 10, and 13. The results are shown in FIG. 19. The cNaD3-MIRTX administration group showed a significant shrinkage of tumor size on day 15 as compared with non-administration group (Parent) (FIG. 19).

(6) Tumor/Liver Accumulation of Freeze-Dried cNaD3

Figure 20:
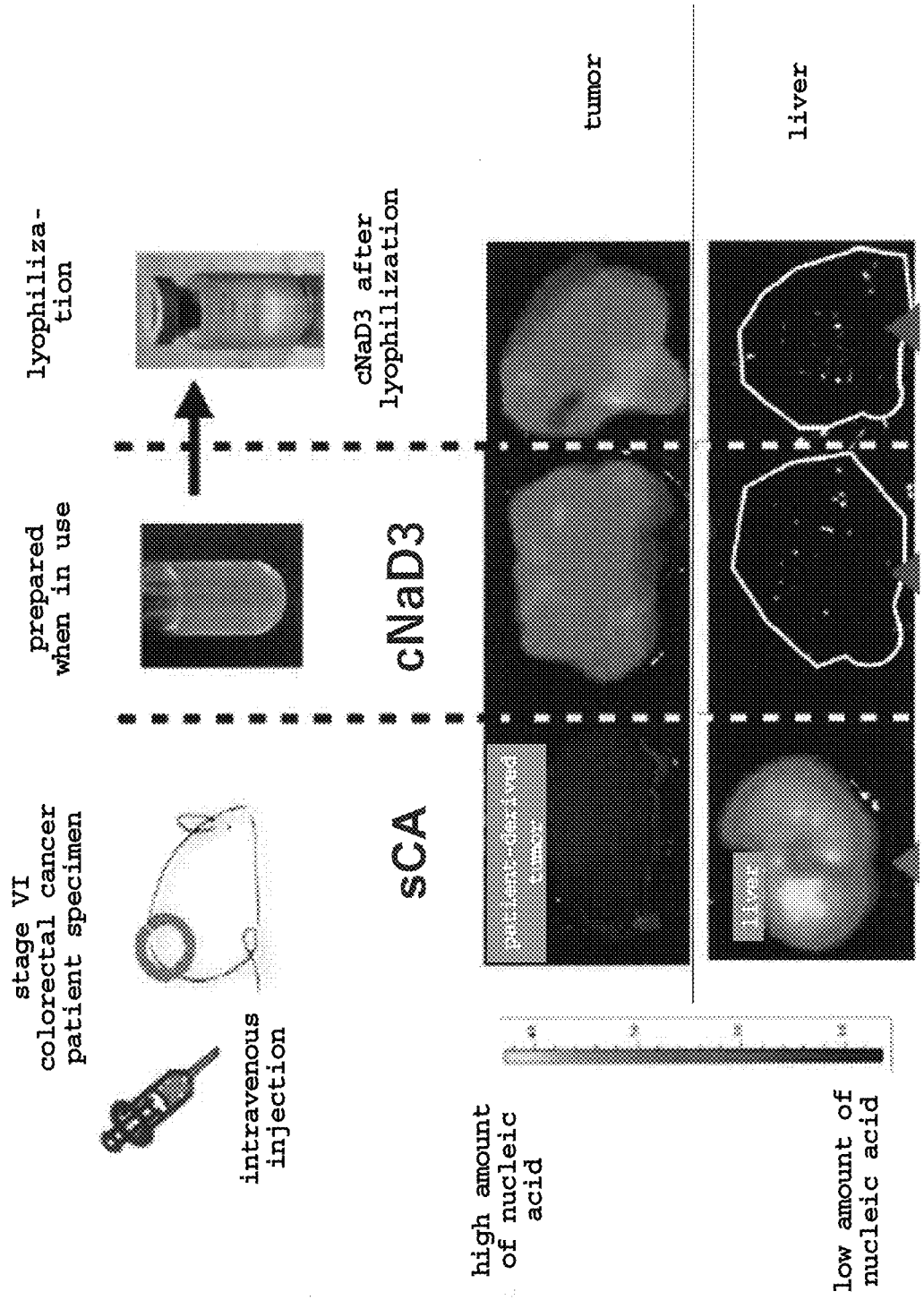
FIG. 20 Diagrams showing the uptake of Alexa750-labeled NC siRNA loaded on sCA and cNaD3 prepared at time of use or lyophilized cNaD3 into mouse subcutaneous tumor and liver.

PDX derived from colorectal cancer patients were implanted in nude mice to create subcutaneous tumors, and 25 μg of negative control siRNA (NC siRNA) labeled with Alexa750 was loaded on sCA and injected intravenously from the tail vein. Similarly, 25 μg of Alexa750-labeled NC siRNA was loaded on cNaD3 and injected intravenously. As cNaD3, cNaD3 prepared when in use and cNaD3 freeze-dried and stored for a long time were used. The accumulation in tumors was observed by IVIS one hour later and accumulation in the liver was observed by IVIS 4 hours later. As a result, when cNaD3 was used, remarkable accumulation in tumors was found as compared with sCA, whereas accumulation in the liver was hardly found, in both cases (FIG. 20).

Example 4 Inflamed Tissue Accumulation of PCANP

Figures 1, 21:
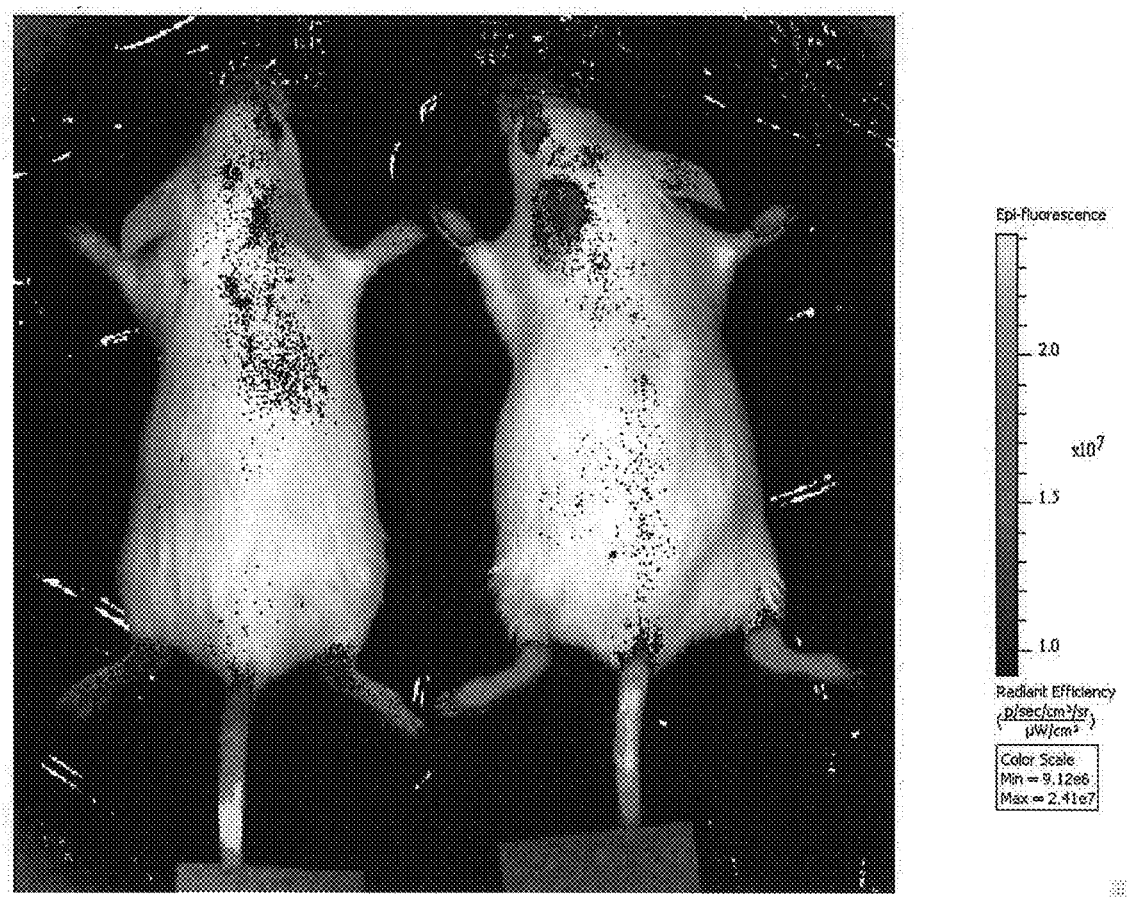
Figures 2, 21:

Carbonate apatite particles loaded with negative control siRNA (NC siRNA) labeled with Alexa750 were treated by Covaris in the presence of a PEG derivative (SUNBRIGHT ME-100CS) (cNaD1-Alexa750), and intravenously injected to SKG mice (purchased from CLEA Japan, Inc.) from the tail vein that spontaneously develop autoimmune arthritis that is immunopathologically very similar to human rheumatoid arthritis. For comparison, sCA loaded with Alexa750-labeled NC siRNA was similarly administered. The accumulation of fluorescent nucleic acid in the inflamed joints of the four limbs was observed 40 minutes later by IVIS and the accumulation in the liver was observed 45 minutes later by IVIS. As a result, when cNaD1 was used, remarkable accumulation in the inflamed joints of the four limbs was observed (FIG. 21-1) as compared with sCA, whereas accumulation in the liver was hardly found (FIG. 21-2). Luminescence in the lower abdomen indicates retention of the fluorescent substance (Alexa750) in the urine in the bladder, and luminescence in the upper abdomen indicates accumulation of Alexa750 in the liver.

Example 5 Uptake of PEG Derivatives into cNaD2 and cNaD3

Figure 22:
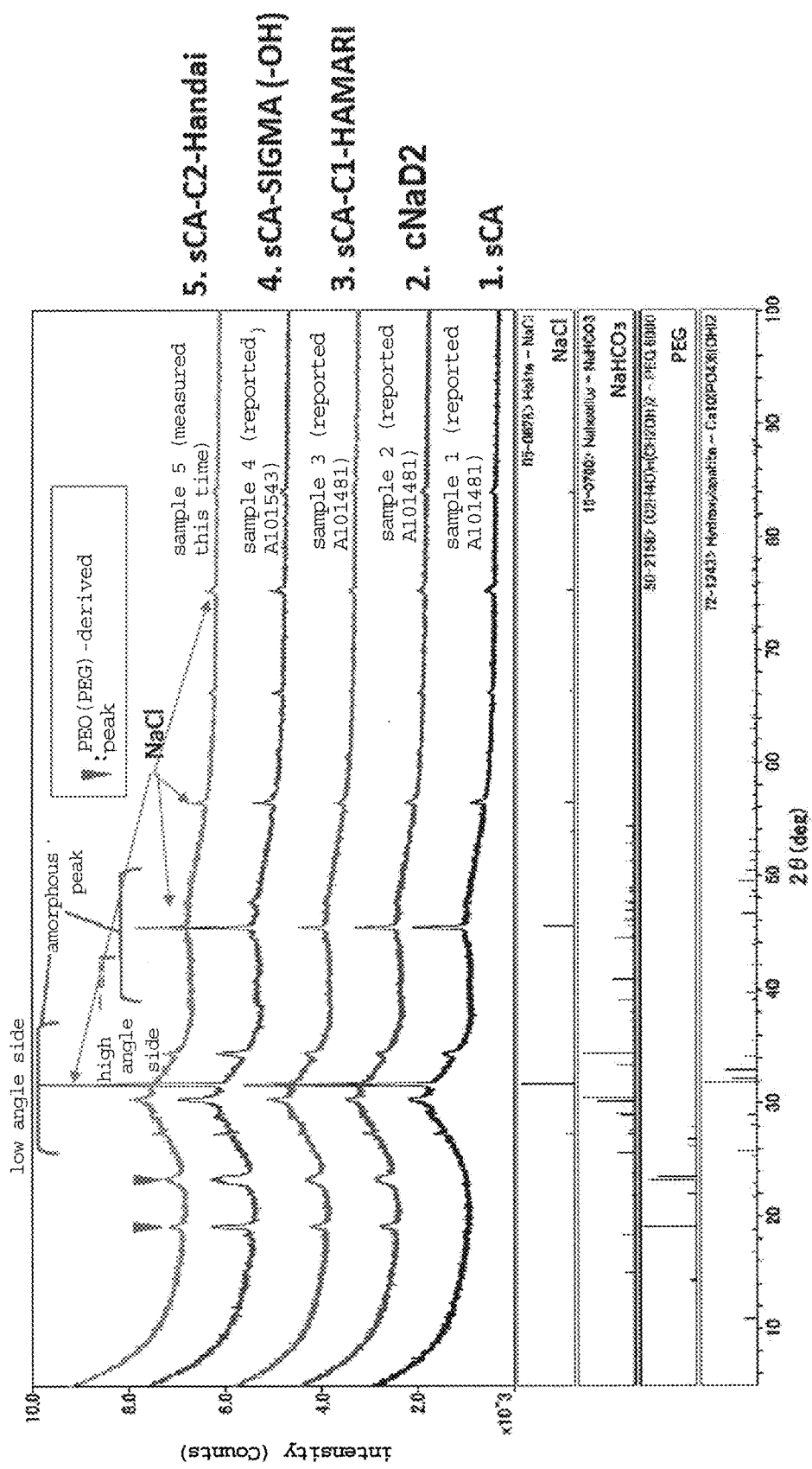
FIG. 22 A diagram showing the results of X-ray diffraction analysis of carbonate apatite particles (sCA-SIGMA(-OH)) produced using sCA, cNaD2, cNaD3 (sCA-C1-HAMARI, sCA-C2-Handai), and PEG-OH.

The properties of cNaD2 and two types of cNaD3 (sCA-C2-Handai, sCA-C1-HAMARI) were analyzed using X-ray diffraction method (XRD) and Fourier transform infrared spectroscopy (FT-IR). For comparison, particles (sCA-SIGMA(-OH)) produced using sCA and PEG-OH (manufactured by Sigma) were also analyzed in the same manner. An X-ray diffractometer (D8 ADVANCE) manufactured by Burker AXS was used for XRD, and FT-IRTENSOR II manufactured by Burker AXS was used for FT-IR. As a result of XRD, peaks derived from PEG were detected in cNaD2, cNaD3, and sCA-SIGMA(-OH), suggesting that PEG was taken up into the particles (FIG. 22). Similarly, in FT-IR, peaks derived from PEG were also detected in cNaD2, cNaD3, and sCA-SIGMA(-OH).

The content of PEG derivative in cNaD1 was quantified using $^1$H NMR. Carbonate apatite (5 mg) and a known amount of PEG derivative were mixed, $^1$H NMR of each sample was measured using disodium fumarate as an internal standard, and a calibration curve (y=22.58x; R$^2$=0.9852) was created from the ratio of the integrated values of disodium fumarate and PEG. Then, cNaD1 was suspended almost uniformly by vortexing, and 1 mL each thereof was dispensed. After centrifugation, the supernatant was removed and the residue was dried under reduced pressure (3 mmHg, room temperature, 10-12 hr) to obtain dried cNaD1. EDTA-2Na-2H$_2$O (100 mg) and fumaric acid-2Na (10.0 mg) were mixed and dissolved in 1.0 mL of D$_2$O. From the addition amount of this solution, the weight of EDTA-2Na-2H$_2$O in the $^1$H NMR measurement sample was calculated. $^1$H NMR of each sample was measured, and the ratio of the integrated values of disodium fumarate and PEG was substituted into the prepared calibration curve to calculate the weight of PEG contained in the dried cNaD1. As a result, the ratio of PEG contained in dried cNaD1 was 1.2 to 1.8% (w/w) (Table 6).

TABLE 6

| Sample No. | 1 | 2 | 3 |
|---|---|---|---|
| dry PEGylated apatite (mg) (A) | 3.2 | 3.1 | 3.2 |
| EDTA•2Na•2H$_2$O (mg) | 250 | 150 | 150 |
| fumaric acid•2Na (mg) (B) | 50 | 15 | 15 |
| ratio of $^1$H NMR integrated values (PEG$^{a)}$/fumaric acid•2Na$^{b)}$) (C) | 0.026 | 0.058 | 0.057 |
| weight of PEG contained in A (mg) (D) $^{c)}$ | 0.058 | 0.038 | 0.038 |
| PEG content in PEGylated apatite (w/w %) | 1.8 | 1.2 | 1.2 |

$^{a)}$3.7 ppm, —(CH$_2$CH$_2$O)$_n$—.
$^{b)}$6.4 ppm, vinyk-H.
$^{c)}$ PEG weight (D = B × C/22.58) (mg)

Example 6 Zeta Potential of cNaD2 and cNaD3

The zeta potential of sCA (with Senjyo ultrasonication) and cNaD2 and cNaD3 (each not loaded with nucleic acid) prepared under the same conditions except for the presence or absence and type of PEG derivative was measured using a Zetasizer plate reader. As a result, the zeta potential of all particles was around 0, but shifted slightly to positive when the PEG derivative was taken up (Table 7).

TABLE 7

| Sample | Zeta potential (mV) first time | Zeta potential (mV) second time |
| --- | --- | --- |
| sCA | −2.228 | −2.535 |
| cNaD3 (HAMARI) | 0.1385 | −1.835 |
| cNaD2 | 1.123 | −0.5128 |

INDUSTRIAL APPLICABILITY

The carbonate apatite particles of the present invention administered in vivo show higher accumulation in lesions such as tumor tissue and the like and markedly reduced accumulation in normal organs including the liver. Therefore, they are extremely useful as safe and effective compositions for drug delivery that afford desired therapeutic effects with smaller amounts of drugs.

This application is based on a patent application No. 2021-006747 filed in Japan (filing date: Jan. 19, 2021), the contents of which are incorporated in full herein.

The invention claimed is:

1. A composition comprising carbonate apatite particles loaded with a drug, wherein the carbonate apatite particles have an average particle size of larger than 500 nm and not more than 1000 nm, wherein the carbonate apatite particles are primary particles that are formed in the presence of a polyethylene glycol (PEG) derivative having one or more carboxylic acids or derivatives thereof or salts thereof at the ends thereof, whereby the PEG derivative is taken up in the primary particles.

2. The composition according to claim 1, wherein the PEG derivative has an average molecular weight of 1000 to 20000.

3. The composition according to claim 1, wherein the PEG derivative has an average molecular weight of 1000 to 5000.

4. The composition according to claim 1, wherein the PEG derivative has one or more free carboxylic acids or salts thereof at the end thereof.

5. The composition according to claim 1, wherein the drug is a nucleic acid.

6. The composition according to claim 1, wherein the drug has an antitumor activity.

7. The composition according to claim 1, further comprising albumin.

8. A method for producing the composition according to claim 1, comprising ultrasonicating carbonate apatite particles loaded with a drug and a PEG derivative with a one-point focused-ultrasonicator.

9. The method according to claim 8, wherein the carbonate apatite particles loaded with the drug and the PEG derivative are prepared by mixing a first solution comprising the drug and calcium ion, a second solution comprising phosphate ion and bicarbonate ion, and the PEG derivative.

10. The method according to claim 8, further comprising filtrating the ultrasonicated composition with a hollow fiber membrane to concentrate the carbonate apatite particles.

11. The composition according to claim 1, wherein the drug has an anti-inflammatory activity.

12. A method for producing a composition comprising carbonate apatite particles loaded with a drug, comprising forming carbonate apatite particles having an average particle size of larger than 500 nm and not more than 1000 nm in the presence of the drug and a polyethylene glycol (PEG) derivative having one or more carboxylic acids or derivatives thereof or salts thereof at the ends thereof, whereby the PEG derivative is taken up in the carbonate apatite particles, and the carbonate apatite particles are loaded with the drug.

13. The method according to claim 12, further comprising ultrasonicating the formed carbonate apatite particles.

14. The method according to claim 13, further comprising filtrating the ultrasonicated formed carbonate apatite particles.

15. The method according to claim 12, further comprising at least partially removing the PEG derivative from the carbonate apatite particles.

16. A method for delivering a drug to a subject, comprising administering the composition according to claim 1 to the subject.

17. A method for delivering a drug to a target tissue in a subject, comprising administering the composition according to claim 1 to the subject, wherein the drug has an antitumor activity and the target tissue is a tumor.

18. A method for delivering a drug to a target tissue in a subject, comprising administering the composition according to claim 1 to the subject, wherein the drug has an anti-inflammatory activity and the target tissue is an inflamed tissue.

* * * * *